US012171719B1

(12) United States Patent
Wu et al.

(10) Patent No.: US 12,171,719 B1
(45) Date of Patent: Dec. 24, 2024

(54) FLUID TRANSFER DEVICE

(71) Applicant: Genzyme Corporation, Cambridge, MA (US)

(72) Inventors: Haiming Wu, Weston, MA (US); Danial Ferreira, Woodbridge, CT (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 18/666,379

(22) Filed: May 16, 2024

(51) Int. Cl.
*A61J 1/20* (2006.01)

(52) U.S. Cl.
CPC .................................... *A61J 1/20* (2013.01)

(58) Field of Classification Search
CPC .................................. A61J 1/20; A61J 1/2006
See application file for complete search history.

(56) References Cited

U.S. PATENT DOCUMENTS

| | | | | |
|---|---|---|---|---|
| 4,997,430 | A * | 3/1991 | Van der Heiden | A61M 5/162 604/405 |
| 5,466,220 | A * | 11/1995 | Brenneman | A61J 1/2089 604/87 |
| 6,474,375 | B2 * | 11/2002 | Spero | A61J 1/2089 604/416 |
| 6,558,365 | B2 * | 5/2003 | Zinger | A61J 1/2096 141/330 |
| 7,326,194 | B2 | 2/2008 | Zinger et al. | |
| 7,896,849 | B2 * | 3/2011 | Delay | A61J 1/2089 604/82 |
| 8,425,487 | B2 | 4/2013 | Beiriger et al. | |
| 8,562,584 | B2 | 10/2013 | Beiriger et al. | |
| 9,132,061 | B2 | 9/2015 | Beiriger | |
| 9,339,438 | B2 | 5/2016 | Lev et al. | |
| 9,345,643 | B2 * | 5/2016 | Okiyama | A61J 1/2096 |

(Continued)

FOREIGN PATENT DOCUMENTS

| | | |
|---|---|---|
| WO | WO 2004/068820 A2 | 8/2004 |
| WO | WO 2005/018629 A1 | 3/2005 |

(Continued)

OTHER PUBLICATIONS

Hamers-Casterman et al., "Naturally occurring antibodies devoid of light chains," Nature, Jun. 3, 1993, 363(6428):446-448.

(Continued)

*Primary Examiner* — Frederick C Nicolas
(74) *Attorney, Agent, or Firm* — Fish & Richardson P.C.

(57) ABSTRACT

A fluid transfer device includes a body having a first connecting portion for connecting with a diluent container, and a second connecting portion for connecting with a medicament container. A first fluid channel extends into the first connecting portion, and a second fluid channel extends into the second connecting portion. A discharge duct is configured to connect to a discharge device. A flow control member is selectively fluidically connectable to the first and second fluid channels, the discharge duct, and a discharge channel. The flow control member is movably disposed in or on the body and is movable relative to the body between first and second control positions. In the first control position, the first and second fluid channels are in fluid communication. In the second control position, the discharge duct is in fluid communication with the discharge channel and the first fluid channel or the second fluid channel.

15 Claims, 10 Drawing Sheets

(56) References Cited

U.S. PATENT DOCUMENTS

| | | | | |
|---|---|---|---|---|
| 10,420,927 | B2 * | 9/2019 | Fangrow | A61J 1/2068 |
| 10,688,295 | B2 | 6/2020 | Lev et al. | |
| 10,765,604 | B2 * | 9/2020 | Denenburg | A61J 1/2075 |
| 10,945,921 | B2 | 3/2021 | Denenburg | |
| 11,642,285 | B2 * | 5/2023 | Denenburg | A61J 1/1406 604/405 |
| 11,786,443 | B2 | 10/2023 | Lev et al. | |
| 2011/0087164 | A1 | 4/2011 | Mosler et al. | |
| 2019/0381237 | A1 | 12/2019 | Desbrosses et al. | |
| 2021/0154097 | A1 | 5/2021 | McLoughlin et al. | |
| 2021/0228446 | A1 | 7/2021 | Herrmann | |
| 2023/0052165 | A1 | 2/2023 | Bar-El et al. | |

FOREIGN PATENT DOCUMENTS

| | | | |
|---|---|---|---|
| WO | WO 2006/003388 | A2 | 1/2006 |
| WO | WO 2006/030220 | A1 | 3/2006 |
| WO | WO 2007/017868 | A1 | 2/2007 |
| WO | WO 2020/208626 | A1 | 10/2020 |

OTHER PUBLICATIONS

Holt et al., "Domain antibodies: proteins for therapy," Trends in Biotechnology, Nov. 2003, 21(11):484-490.

Muyldermans, "Single domain camel antibodies: current status," Reviews in Molecular Biotechnology, Jun. 2001, 74(4):277-302.

Needle-based injection systems for medical use Requirements and test methods, Part 1: Needle injection systems, ISO 11608-1:2014(E), Third Edition, Switzerland, ISO, Dec. 15, 2014, pp. 1-13.

Ward et al., "Binding activities of a repertoire of single immunoglobulin variable domains secreted from *Escherichia coli*, " Nature, Oct. 1, 1989, 341(6242):544-546.

U.S. Appl. No. 18/666,320, filed May 16, 2024, Haiming Wu.

U.S. Appl. No. 18/666,279, filed May 16, 2024, Haiming Wu.

U.S. Appl. No. 18/666,417, filed May 16, 2024, Haiming Wu.

* cited by examiner

FLUID TRANSFER DEVICE

TECHNICAL FIELD

The present disclosure relates to the field of fluid transfer devices, specifically, to fluid transfer devices configured for transferring a fluid between a diluent container and a medicament container, e.g., for preparing or reconstituting a liquid medicament and/or for administering a medicament by way of injection or infusion. In another aspect the present disclosure relates to a kit comprising a fluid transfer device. In still another aspect the disclosure relates to methods of transferring a fluid between a diluent container and a medicament container, e.g., for the purpose of preparing a reconstitutable medicament, for reconstituting a reconstitutable medicament and/or/ for administering a reconstituted liquid medicament.

BACKGROUND

Patients suffering from certain diseases like, for example, haemophilia or requiring enzyme replacement therapy have to take regular intravenous (IV) infusions. The infusions often have to be mixed and prepared, sometimes to the specific needs of the patient, (and sometimes a short time before drug administration) which may include reconstitution of the drug powder from multiple vials using an exact amount of sterile liquids like water and/or saline. As this preparation process is typically complex and tedious, it is usually performed by a health care professional in a clinic or pharmacy, potentially using lab equipment.

Generally, administering a medicament by way of infusion may require a rather clean or sterile environment. A patient may therefore have to regularly visit an ambulance or health care center.

Self-medication or home-medication for administering a medicament through infusion or injection is and remains quite challenging but is very attractive for patients thereby avoiding problems and circumstances involved in visiting a health care center. With home- or self-medication a patient or user, e.g. intending to establish a vascular access to a patient's body, may be obliged to use only one hand, which might be rather cumbersome and thus challenging.

In addition, it is often required to establish or maintain a clean and/or sterile environment especially in the field of home-medication or self-medication as well as providing of a clean and sterile storage environment for medicaments and medicament containers, medical device accessory and medical devices.

It is therefore desirable to provide improvements in the field of home medication or self-medication, which allow a user or caregiver to prepare and to administer a medicament by way of injection or infusion. It is further desirable to provide an improved storage and transportation of medical devices, medicaments, medical device accessory and the like components required for home- or self-medication. Furthermore, there should be provided improvements in guiding and assisting a user in conducting or executing numerous steps in the course of preparing medicaments and/or in the course of preparing administering of a medicament, e.g. by way of infusion or injection.

Some medicaments to be administered by injection or infusion may be provided in a co-called injection vial, either in liquid or powdered form. Such injection vials typically comprise a barrel filled with the medicament either in a liquid or powdered form. The barrel is typically sealed towards an outlet by a pierceable stopper. The pierceable stopper may be fixed to a barrel head, which may also provide a mechanical fastening for a vial adapter.

Vial adapters are widely known in the art and may provide a well-defined fastening to the barrel head of an injection vial. They may comprise a spike to penetrate the pierceable stopper sealing the outlet of the injection barrel. The spike is typically in fluid communication with a connector, e.g. implemented as a standardized connector that may provide a mechanical fastening of an injection device so that the liquid content provided inside the injection vial can be withdrawn by the injection device, e.g. by a syringe or the like medicament container connectable to the vial adapter.

In some instance a medicament presentation for a patient might include a comparatively large number of vials, wherein each vial includes a specific amount of a specific medicament, wherein the medicament contained in one vial might be the same as or different from the medicament of another vial, e.g. with respect to the amount, dose and/or kind of medicament. Thus, preparation of the medicament presentation includes reconstitution of the medicament contained in the respective vial and pooling of the reconstituted medicaments prior to administration. This is a complex and burdensome process leading to long preparation times and a high risk for errors, e.g. contamination of the medicament presentation. Further, multiple mixing and vial pooling steps may increase the risk of medicament loss.

Therefore, it would be beneficial to provide improvements for preparation of medicament presentations including pooling of medicaments from multiple medicament containers.

In addition, it would be desirable to provide improvements regarding reconstitution of multiple doses of a medicament that are provided in a number of medicament containers, such as vials. Here, reconstitution and pooling of multiple doses of medicament should be simplified and failure safe. There should be also provided an intuitive and easy handling or preparing numerous doses of a medicament that are provided in a number of medicament containers, such as vials.

SUMMARY

The above-mentioned drawbacks are solved by a fluid transfer device, and by a kit as well as by a method of preparing a medicament for injection or infusion in accordance with the independent claims. Further examples and features are subject matter of the dependent claims, respectively.

In one aspect there is provided a fluid transfer device. The fluid transfer device comprises a body. The body comprises a first connecting portion for connecting with a first diluent container. The body further comprises a second connecting portion for connecting with a first medicament container. The first medicament container may comprise an injection vial filled with a reconstitutable medicament, e.g., filled with a lyophilized medicament. The diluent container may comprise a diluent vial or some other type of diluent container that is filled with a diluent or solvent, e.g., water for injection.

The fluid transfer device further comprises a first fluid channel extending into the first connecting portion to fluidically communicate with an interior of the first diluent container, specifically, when the first diluent container it is duly connected with the first connecting portion of the body of the fluid transfer device.

The fluid transfer device further comprises a second fluid channel extending into the second connecting portion to fluidically communicate with an interior of the second medicament container, specifically, when the second medicament container is duly connected with the second connecting portion of the body of the fluid transfer device.

The fluid transfer device further comprises a discharge duct, which is configured to connect to a discharge device. One example of a discharge device may be a syringe or some other type of medicament discharging device, such as an injection device or an infusion line. The fluid transfer device also comprises a first discharge channel, which is separated from the discharge duct as well as from the first and the second fluid channels.

The fluid transfer device also comprises a first flow control member selectively fluidically connectable to the first chamber, to the second fluid channel, to the discharge duct and to the first discharge channel. The first flow control member is movably disposed in or on the body and is movable relative to the body between a first control position and a second control position. By moving the first flow control member a mutual interconnection between the first fluid channel, the second fluid channel, the discharge duct and the first discharge channel can be selectively controlled and configured as well as re-configured.

When the first flow control member is in the first control position the first fluid channel is in fluid communication with the second fluid channel. Accordingly, and when the first connecting portion is connected with the first diluent container and when the second connecting portion is connected with the first medicament container there is provided a fluid communication between the interiors of the first diluent container and the first medicament container via the first fluid channel, the second fluid channel and the first flow control member in the first control position. In this configuration the diluent provided in the first diluent container is allowed to transfer into the first medicament container, e.g., in order to reconstitute the lyophilized medicament provided inside the first medicament container.

When the first flow control member is in the second control position the discharge duct is in fluid communication with one of the first fluid channel and the second fluid channel. The discharge duct is further in fluid communication with the first discharge channel. The first discharge channel may be in fluid communication or may be coupleable in a fluid communicating manner to a supply of a further fluid, e.g. a diluent or medicament. In the second control position of the first fluid control member the discharge duct is in fluid communication with one of the first fluid channel and the second fluid channel. Typically, the discharge duct is in fluid communication with only one of the first fluid channel and the second fluid channel. The discharge duct may be in fluid communication with the second fluid channel presumed that the diluent as provided in the first diluent container has been transferred into the first medicament container while or during the first flow control member is in the first control position.

While in the first control position the diluent provided by the first diluent container may be transferred into the medicament container. Then and inside the medicament container the diluent is brought in mechanical contact with the medicament in order to prepare the medicament or to reconstitute the medicament. Now and by switching the first flow control member, e.g., from the first control position, into the second control position the second flow channel may be brought in fluid communication with the discharge duct by way of which the liquid and reconstituted medicament as provided inside the first medicament container can be withdrawn or expelled towards or into the discharge device, which is connected to the discharge duct in a fluid transferring manner.

By having the first discharge channel also in fluid communication with the discharge duct there can be provided a further liquid substance directly to the first flow control member while the reconstituted or prepared medicament provided in the first medicament container in liquid form is withdrawn from the first medicament container. Via the first discharge channel there may be provided a further dose of the same or of a further medicament or there may be provided a further amount of a solvent or diluent required for preparing the medicament.

In this way and simply by switching the first control member from the first control position into the second control position the fluid transfer device can be reconfigured or switched between different fluid communication modes. In the first control position there is provided a fluid connection between the first diluent container and the first medicament container. In the second control position there is provided a selective fluid communication between the discharge duct and at least one of the first diluent container and the first medicament container.

In situations, in which the medicament container contains a liquid medicament it is also conceivable, that in the first control position of the first flow control member the medicament provided in the first medicament container is transferred into the diluent container. It may be then that in the second control position the first flow control member is configured to fluidically connect the discharge duct with the first flow channel and hence with the first diluent container for withdrawing or expelling the prepared medicament from the first diluent container towards and into the discharge duct and hence towards the discharge device.

According to a further example and when the first flow control member is in the first control position the first discharge channel may be disconnected from any of the first fluid channel and the second fluid channel. Also, the discharge duct may be decoupled or disconnected from any of the first fluid channel and the second fluid channel. Hence, and when the first flow control member is in the first control position there may be exclusively provided a fluid transferring connection between the first fluid channel and the second fluid channel. Also, in the first control position the first discharge channel may be disconnected from the discharge duct. In this way it may be provided that in the first control position there is only and exclusively established a flow communication between the first diluent container and the first medicament container. Since the discharge duct and/or the first discharge channel are disconnected from any of the first fluid channel and the second fluid channel neither the medicament nor the diluent can be inadvertently withdrawn from any of the first diluent container and the first medicament container towards or into the discharge duct. In this way there can be provided a rather failure safe handling and operation of the fluid transfer device.

In the second control position of the first flow control member the first fluid channel and the second fluid channel may be fluidically disconnected or decoupled from each other. Any further mixing or interchange of diluent or medicament between the first diluent container and the first medicament container can be effectively prevented. The fluid transfer device is then only and exclusively configured to withdraw or to expel a previously prepared or reconstituted liquid medicament from at least one of the first diluent container and the first medicament container.

According to a further example at least one of the first fluid channel, the second fluid channel, the discharge duct and the first discharge channel is located inside or extends through the body of the fluid transfer device. At least one or even all of the first fluid channel, the second fluid channel, the discharge duct and the first discharge channel may extend inside and/or through the body. They may be implemented as a bore extending through the body or as a lumen extending through the body. The body may comprise a rather solid or rigid geometric structure. It may comprise an injection molded plastic material, wherein the first fluid channel, the second fluid channel, the discharge duct and the first discharge channel may be integrally formed inside the body. Such a configuration or implementation is of practical use and may be easy to manufacture, e.g. by injection molding of the body. In this way, manufacturing costs can be kept in a comparatively low range and manufacturing or assembling of the fluid transfer device may be rather cost efficient.

According to a further example the first control member is movable relative to the body into a third control position, in which the first fluid channel is disconnected from the second fluid channel. Moreover, and according to another example and when the first control member is in the third control position the discharge duct is disconnected from at least one of the first fluid channel, the second fluid channel and the first discharge channel. In a further example and when the first control member is in the third control position any of the first fluid channel, the second fluid channel, the discharge duct and the first discharge channel may be disconnected from any other of the first fluid channel, the second fluid channel, the discharge duct and the first discharge channel. In this way, every one of the first fluid channel, the second fluid channel, the discharge duct and the first discharge channel may be fluidically disconnected from each other.

In this configuration, and when the first control member is in the third control position the first fluid channel, the second fluid channel as well as the discharge duct and the first discharge channel are fluidically isolated. Hence, the first diluent container and the first medicament container, which may be in fluid connection with the respective first fluid channel and the second fluid channel remain fluidically decoupled or disconnected as long as the first control member is in the third control position. This allows a preassembly of the first diluent container and the first medicament container to the respective first and second connecting portions of the body of the fluid transfer device without establishing a flow connection between the first diluent container and the first medicament container.

A mixing of the content of the first diluent container and the first medicament container may be controlled and may be established on demand, exclusively by transferring the first control member from the third control position, which may be an idle, initial or default control position, into the first control position by way of which the first diluent container gets in fluid connection with the first medicament container.

Accordingly and by default, the first control member may be in the third control position so as to prevent any premature exchange of a content between the first fluid channel, the second fluid channel, the discharge duct and the first discharge channel.

According to another example the fluid transfer device comprises a first actuator mechanically coupled to the first flow control member and movable relative to the body by a user to induce a movement of the flow control member into the second control position. The first actuator may be longitudinally or rotationally displaceable relative to the body of the fluid transfer device. The first actuator may be movable from a first position to a second position and optionally even into a third position, wherein the respective position of the first actuator may coincide with a respective position of the first flow control member. The first actuator is typically operable or actuatable from outside the fluid transfer device. It may protrude from an outside surface of the body of the fluid transfer device. This may allow an easy operation or handling of the first actuator to move the actuator between any of a first actuator position, a second actuator position and an optional third actuator position.

When in the first actuator position the first flow control member is in the first control position. When the first actuator is in the second actuator position the first flow control member is in the second control position and when the first actuator is in the third actuator position the first flow control member is in the third control position. By way of the actuator the first flow control member may be located inside the body and may be non-accessible from outside the body. The first actuator, which is mechanically coupled to the first flow control member therefore provides a kind of a mechanical remote control of the first flow control member. Moreover, the first actuator may provide an easy and intuitive operation of the fluid transfer device, specifically, an easy and straightforward as well as intuitive operation of the first flow control member.

In a further example the first actuator may be also movable relative to the body by a user to induce a movement of the flow control member into the first control position. Optionally, the first actuator may be also movable relative to the body by a user to induce a movement of the flow control member from any of the first control position or the second control position into the third control position. In addition, the first actuator may be movable relative to the body to induce a movement of the flow control member from the third control position into any of the first control position and the second control position.

In one example the first actuator may be displaceable along a first direction relative to the body to switch the first flow control member from the first control position into the third control position and further into the second control position. The first actuator may be movable in an opposite direction to switch or to transfer the first flow control member from the second control position into the third control position and into the first control position. In some examples the first control position and the second control position are end positions of the first flow control member and the third control position is a position located between the first control position and the second control position. Likewise, the first actuator may be movable along a first direction from the first actuator position into the third actuator position and further into the second actuator position. It may be movable in an opposite direction from the second actuator position into the third actuator position and further into the first actuator position. Also here, the first and the second actuator positions may be end positions with the third actuator position located between the first and second actuator positions.

In another example the fluid transfer device comprises a second actuator mechanically coupled to the first flow control member and movable relative to the body by a user to induce a movement of the flow control member into the first control position. Hence, the second actuator may be actuatable in or towards an operation direction that is opposite to the operation or actuation direction of the first actuator. In some examples, the first actuator may be depressible along a first direction. The second actuator may be also depressible along a second direction. The first and the second directions may be opposite direction.

By way of a second actuator it may be provided that oppositely directed movements of the first flow control member may be controlled by the first actuator and by the second actuator separately. Hence, the first actuator may be exclusively configured to transfer or to move the first flow control member from the first position into the second position. It may be inoperable to induce a return movement of the first flow control member from the second control position into the first control position. Here, the second actuator may provide a respective functionality. The second actuator may be exclusively configured to induce or to transfer a movement of the flow control member from the second control position into the first control position. Likewise, and when the first flow control member is also transferable into a third control position, which may be located between the first control position and the second control position, the first actuator may be configured to transfer the first flow control member from the first control position via the third control position into the second control position. Likewise, the second actuator may be exclusively configured to transfer or to move the first flow control member from the second control position towards and into the third control position and further into the first control position.

In a further example and when the first flow control member is in the third control position the first flow control member may be transferred into the first control position by actuating the second actuator, e.g. by depressing the second actuator. Subsequently, the first flow control member may be transferred from the first control position beyond the third control position into the second control position by the first actuator, e.g. by depressing the first actuator in a direction opposite to the previous actuation of the second actuator.

In a further example the first actuator and the second actuator may be mutually connected or mechanically coupled. Hence, an operation or actuation of the first actuator along a first direction may transfer the also the second actuator in or along the respective first direction. Accordingly, a movement of the second actuator along the second direction may transfer the first actuator in the second direction as well. In this way it can be provided, that both, the first actuator and the second actuator may be implemented as depressible actuators. The first actuator may be provided initially in an extended state, in which it may at least slightly protrude from a side of the body of the fluid transfer device. It may be then depressible towards or into the body, e.g. along a first direction. Such a depressing motion may induce a respective protruding or projecting motion of the first actuator, which may be then depressible in the opposite direction, e.g. the second direction, which depression may induce a respective movement of the first actuator along the second direction.

By way of a first actuator and a second actuator mechanically connected or even integrally formed there can be provided a redundant operation of the first flow control member. Operational security and robustness of operation of the fluid transfer device can be increased in this way.

According to a further example the first actuator is located at a first side section of the body. The second actuator is located at a second side section of the body. The first side section and the second side section are opposite side sections of the body. Such an arrangement is of particular benefit to provide oppositely oriented operation or actuation of the first actuator and the second actuator. Such an arrangement or configuration may be benefit when the first actuator and the second actuator are mechanically connected or mechanically coupled. An inwardly directed depressing of the first actuator may then induce an outwardly directed movement of the second actuator; and vice versa, an inwardly directed depression or movement of the second actuator may induce a respective outwardly directed movement of the first actuator. In in this way there can be provided a rather intuitive, failure safe and straightforward operation or control of the first flow control member.

According to a further example the fluid transfer device comprises an interlock mechanism, that is mechanically engageable with the first actuator and which is switchable between a locking configuration and a release configuration. When in the locking configuration the interlock mechanism is operable to block or to impede a movement of the first actuator into the second control position. In this way it can be provided that establishing of a fluid communication between the discharge duct and one of the first fluid channel and the second fluid channel can only be established when the interlock mechanism is in the release configuration. In this way there can be effectively prevented a premature release or discharge of a fluid from any of the diluent container or medicament container. In this way, patient safety can be enhanced and a risk of an inadvertent loss of medicament can be reduced.

According to a further example the fluid transfer device comprises a discharge device connector in fluid communication with the discharge duct. The discharge device connector is configured to mechanically connect with the discharge device. The discharge device connector may comprise a standardized connector, such as one of a male or female Luer connector by way of which there can be provided a fluid communication between the discharge duct and the discharge device. The discharge device connector may provide a selective connection and disconnection between the discharge duct and the discharge device.

According to another example the discharge device connector is operably connected to the interlock mechanism. The interlock mechanism is transferable into the release configuration by establishing a mechanical connection between the discharge device connector and the discharge device. In this way it can be provided that a connection of the discharge device to the discharge device connector releases the interlock mechanism by way of which the first actuator is then allowed to move into a dedicated actuator position and to transfer the first flow control member into one of the first control position, the second control position and the optional third control position. Specifically, the interlock mechanism is configured to prevent a premature transfer of the first flow control member into the extended control position.

Insofar, connecting of the discharge device to the discharge device connector may cause a transferring of the interlock mechanism into the release configuration, in which the first actuator is allowed to move into the second control position by way of which the first flow control member is switched into the second control position to establish a fluid communication between the discharge duct and at least one of the first fluid channel and the second fluid channel, e.g., for withdrawing a reconstituted or prepared medicament from the respective container that is in fluid communication with the respective fluid channel.

According to a further example it may be further provided, that connecting of the discharge device may require movement or inserting the discharge device into the discharge device connector along an insert direction. The insert direction may coincide with a movement direction of the first actuator along which the first actuator moves from the first actuator position towards and into the second actuator position. Insofar, connecting the discharge device along a connecting direction to the discharge device connector may induce a two-step process. In this way and during a connection of the discharge device with the discharge device connector the interlock mechanism may be released. As discharge device is further introduced or moved towards the discharge device connector at least one of the discharge device connector and the discharge device may further engage with the first actuator to move the first actuator towards and into the second actuator position by way of which the first flow control member is switched into the second control position for withdrawal of a medicament from one of the diluent container and the medicament container.

According to a further example the fluid transfer device is not limited to provide a fluid connection only between a first diluent container and a first medicament container. Rather, the fluid transfer device may comprise numerous connecting portions each of which being connectable with one of a further diluent container and a further medicament container. In this way, the fluid transfer device may provide a mixing numerous diluents provided in numerous diluent containers and numerous medicaments provided in numerous medicament containers. In a first step, there may be a one-to-one connection between one diluent container with one medicament container. In a second configuration or second step the reconstituted or prepared medicament provided in one of the diluent container and the medicament containers may be then transferred towards and into the discharge duct.

In this way the fluid transfer device provides a multiple mixing, preparation or reconstitution of multiple medicaments or medicament doses with multiple diluent or diluent doses and a subsequent withdrawal or supply of the reconstituted or prepared medicaments to a common discharge duct towards a discharge device.

According to a further example the fluid transfer device comprises a third connecting portion for connecting with a second diluent container. The fluid transfer device comprises a fourth connecting portion for connecting with a second medicament container. The third and the fourth connecting portions may be provided in the body of the fluid transfer device in the same or like manner as the first and the second connecting portions. The fluid transfer device further comprises a third fluid channel extending into the third connecting portion to fluidically communicate with an interior of the second diluent container. The fluid transfer device further comprises a fourth fluid channel extending into the fourth connecting portion to fluidically communicate with an interior of the second medicament container.

The fluid transfer device further comprises a second flow control member selectively fluidically connectable to the third fluid channel, to the fourth fluid channel and to the first discharge channel. The second flow control member is movably disposed in or on the body and is movable relative to the body between a first control position and a second control position. When the second flow control member is in the first control position the third fluid channel is in fluid communication with the fourth fluid channel. When the second flow control member is in the second control position the first discharge channel is in fluid communication with one of the third fluid channel and the fourth fluid channel. The third connecting portion and the third fluid channel may be implemented in a like or similar or even identical manner as the first connecting portion and the first fluid channel.

Correspondingly, the fourth fluid channel and the fourth connecting portion may be implemented in the same or like or even identical manner as the second fluid channel and the second connecting portion, respectively. Moreover, the second flow control member may be correspondingly implemented like the first flow control member. It may comprise a similar or identical structure compared to the first flow control member with the only exception, that it is only the first flow control member that is connected to the discharge duct. The second flow control member is connected to the first discharge channel instead of a connection to the discharge duct. Hence, the first and the second flow control members may be mutually interconnectable via the first discharge channel. They may be fluidically connected in series via the first discharge channel.

Likewise, the second flow control member may be connected or mechanically engaged with the first control member and the optional second control member in the same way as described above in connection with the first flow control member. Moreover, the second flow control member may be also transferable into a third control position, in which the third fluid channel is disconnected from the fourth fluid channel and wherein the first discharge channel is disconnected from at least one of the third fluid channel and the fourth fluid channel.

By way of the third connecting portion and the third fluid channel as well as by way of the fourth connecting portion and the fourth fluid channel and further by way of the second flow control member there can be provided a pairwise mixing of diluents and medicaments as provided in first and second diluent containers and in first and second medicament containers, respectively.

Typically, and when the first and the second flow control members are in the first configuration there is provided an exclusive fluid connection between the first diluent container and the first medicament container as well as between the second diluent container and the second medicament container. The respective diluent may then exclusively flow into the respectively connected medicament container. Hence, the diluent provided in the first medicament container is allowed to flow into the first medicament container. The diluent provided in the second diluent container is allowed to flow into the second medicament container. In the respective medicament containers there may be then conducted a medicament preparation or medicament reconstitution process. Thereafter, the first and second flow control members may be transferred into the second control position. Then, the prepared or reconstituted medicament, e.g., provided in the first medicament container and in the second medicament container may be simultaneously transferred into the discharge duct.

Here, the first reconstituted medicament provided in the first medicament container may the transferred via the second fluid channel into the first flow control member and further into the discharge duct. The second medicament provided in the second medicament container may be transferred via the fourth fluid channel into the second flow control member and further into the first discharge channel, which is further connected to the discharge duct. Hence, the second medicament may be transferred from the second medicament container through the fourth fluid channel into the second flow control member and further into the first discharge channel through the first flow control member and then into the discharge duct towards and into the discharge device.

Hence, and when the first and the second flow control members are in the second control position there can be provided a pooling of individual doses of the same or of different medicaments provided in first and second medicament containers connected to the second connecting portion and connected to the fourth connecting portion of the fluid transfer device.

According to a further example the fluid transfer device comprises a fifth connecting portion for connecting with a third diluent container. The fluid transfer device further comprises a sixth connecting portion for connecting with a third medicament container. The fluid transfer device comprises a fifth fluid channel extending into the fifth connecting portion to fluidically communicate with an interior of the third diluent container. The fluid transfer device further comprises a sixth fluid channel extending into the sixth connecting portion to fluidically communicate with an interior of the third medicament container.

The fluid transfer device further comprises a second discharge channel, which is in flow communication with the second flow control member. There is further provided a third flow control member, that is selectively and fluidically connectable to the fifth fluid channel, through the sixth fluid channel and to the second discharge channel. The third flow control member is movably disposed in or on the body and is movable relative to the body between a first control position and a second control position. When the third flow control member is in the first control position the fifth fluid channel is in fluid communication with the sixth fluid channel. When the third flow control member is in the second control position the second discharge channel is in fluid communication with one of the fifth fluid channel and the sixth fluid channel.

The fifth connecting portion and the fifth fluid channel may be implemented in the same or like or even identical manner as the first connecting portion and the first fluid channel or in the same or in the like manner as the third connecting portion and the third fluid channel, respectively. Likewise, the sixth connecting portion and the sixth fluid channel may be implemented in the same or like or even identical manner as the second connecting portion and the second fluid channel or in the same or like manner as the fourth connecting portion and the fourth fluid channel, respectively.

Also, the third flow control member may be implemented in the same or like manner as the first flow control member or the second flow control member with the only exception that the third flow control member is fluidically connectable to the second flow control member by the second discharge channel. Insofar, all features and effects as described above in connection with the first connecting portion and the first fluid channel or as described above in connection with the third connecting portion and the third fluid channel equally apply to the fifth connecting portion and the fifth fluid channel. Likewise, all effects, features and benefits as described above in connection with the second connecting portion and the second flow channel or as described above in connection with the fourth connecting portion and the fourth flow channel equally apply to the sixth connecting portion and the sixth fluid channel. The same applies to the third flow control member in comparison to the first flow control member and/or in comparison with the second flow control member.

In this way and when the number of connecting portions is duly connected with a respective number of diluent containers and medicament containers there is provided a direct fluid connection between the first diluent container and the first medicament container, between the second diluent container and the second medicament container as well as between the third diluent container and the third medicament container, namely, when the first flow control member, the second flow control member and the third flow control member are in their respective first control position. By switching the number of flow control members into the second control position the fluid provided in the medicament containers can be withdrawn or transferred towards and into the discharge duct.

When the third flow control member is in the first control position there is provided a mixing of the diluent provided in the third diluent container with the medicament provided in the third medicament container. Typically, the diluent is transferred into the third medicament container. Then and by switching the third flow control member into the second control position there is provided a fluid communication between the sixth fluid channel with the second discharge channel by way of which the liquid medicament as provided in the third medicament container is transferable or is transferred to the third flow control member and further into the second discharge channel towards the second flow control member. From there, the respective medicament can be transferred from the second discharge channel into the first discharge channel when the second flow control member is in the second control position. From there, the liquid medicament can be transferred further from the first discharge channel into the discharge duct when the first flow control member is in the second control position.

According to another example and when the second flow control member is in the second control position the second discharge channel is in fluid communication with the first discharge channel.

This allows to provide a pooling or a transfer of a liquid substance or medicament from the assembly of the fifth and sixth fluid channels towards and into the second discharge channel and further into the first discharge channel for a pooling of the numerous liquid substances as provided by the numerous medicament containers.

According to a further example the first flow control member and the second flow control member are synchronized. In a further example also the third flow control member is synchronized with at least one of the first flow control member and the second flow control member. In a further example all flow control members are synchronized. Accordingly, the first flow control member, the second flow control member and the optional third flow control member are mechanically coupled to the first actuator and optionally also to the second actuator. In this way and when operating at least one of the first actuator and the second actuator any of the first flow control member, the second flow control member and the third flow control member may be moved or transferred in a synchronous or simultaneous manner. In this way it can be provided that all flow control members are synchronously switched between the first control position, the second control position and the optional third flow control position.

According to a further example the first flow control member comprises a three-way valve. Also, the second flow control member and/or the third flow control member comprises a respective three-way valve. By way of a three-way valve there can be provided the above described selective fluid communication between the numerous fluid channels, the discharge duct and the numerous discharge channels.

According to a further aspect the present disclosure also relates to a kit. The kit comprises a fluid transfer device as described above. The kit further comprises at least a first diluent container and at least a first medicament container. The medicament container may be filled or may be provided with a medicament. The medicament container may contain a reconstitutable medicament. The diluent container may comprise a corresponding diluent or solvent, which when mixed with the medicament in the first medicament container provides reconstitution of the medicament or preparation of the medicament, e.g., dilution of the medicament to a predefined degree.

The kit may be further provided with a second diluent container and a second medicament container. Also, the kit may be provided with a third medicament container and a third diluent container for coupling, fixing or for connecting to the respective connecting portion of the body of the fluid transfer device. It should be noted that the transfer device is by no way limited to the fluid connection of only three diluent containers and only three medicament containers.

The presently described and illustrated concept may be expanded to a larger number of connecting portions and fluid channel as well as flow control members in a manner as described above.

According to another aspect the present disclosure also relates to a method of preparing a medicament for injection or infusion. The method comprises the steps of using and/or providing a fluid transfer device comprising a first connecting portion, a second connecting portion, a discharge duct and a first flow control member transferable into first and second control positions, respectively. The method comprises the steps of connecting a first diluent container to the first connecting portion of the fluid transfer device. In a further step a first medicament container is connected to the second connecting portion of the fluid transfer device. Thereafter the first flow control member is transferred into the first control position. Alternatively, the first flow control member is already in the first control position. Then, the respective transferring of the first flow control member into the first control position may be omitted.

When in the first control position the first flow control member provides a flow connection between the first diluent container and the first medicament container. The first medicament container may be vacuumized or may be provided at a negative pressure. Insofar and when duly connecting the first medicament container to the second connecting portion there may be provided a negative pressure to the second fluid channel, which may serve to draw the first diluent into the first fluid channel when establishing a fluid connection between the first fluid channel and the second fluid channel, e.g., by switching the first flow control member into the first control position.

Thereafter the diluent is transferred from the first diluent container into the first medicament container to prepare the medicament. By mixing the diluent with the medicament, e.g., inside the medicament container the medicament may be prepared or reconstituted. Thereafter, the first flow control member is transferred into the second control position. At least a portion of the prepared medicament may be then withdrawn from the first medicament container via the discharge duct. Here, and when the first flow control member is in the second control position there is provided a fluid communication between the discharge duct and the second fluid channel.

In some examples, the method of preparing the medicament for injection or infusion is conducted or executed by making use of a fluid transfer device as described above. Insofar all effects, benefits and features as described above in connection with the fluid transfer device equally apply to the method of preparing a medicament for injection or infusion; and vice versa.

The method of preparing a medicament for injection may be typically conducted to connect also a second diluent container to a third connecting portion of the fluid transfer device and to connect a second medicament container to a fourth connecting portion of the fluid transfer device. Optionally, the method may also include connecting a third diluent container to a fifth connecting portion and connecting a third medicament container to a sixth connecting portion. Here, the fluid transfer device may comprise also second and third flow control members transferable between first and second control positions, respectively. Then and by transferring the respective first, second and third flow control members into their first control position there may be established a pairwise fluid communication between the first diluent container and the second medicament container, between the second diluent container and the second medicament container and between the third diluent container and the third medicament container.

In this way, there may be provided a simultaneous and pairwise mixing of medicaments and diluents without any cross-contamination between pairs of medicament containers and diluent containers. Hence, with the first flow control member in the first control position there can be only and exclusively provided a flow communication between the first diluent container and the first medicament container. With the second flow control member in the first control position there can be provided an exclusive and isolated flow communication between the second diluent container and the second medicament container. With the optional third flow control member in the first control position there can be provided an exclusive and isolated flow communication between the third diluent container and the third medicament container.

Then, there may be conducted a multiple reconstitution process in the respective first, second and third medicament containers. By switching the first, second and third flow control members simultaneously or synchronously into the second control position and by connecting a discharge device to the discharge duct there may be then established a fluid connection between the first medicament container and the discharge duct, between the second medicament container and the discharge duct and the third medicament container and the discharge duct. In this way, the reconstituted medicaments as provided in the first, second and third medicament containers may be simultaneously withdrawn into a common discharge device. In this way, there is provided a rather easy, efficient, and straightforward pooling of numerous doses of a medicament or of various medicaments provided in separate medicament containers.

According to another aspect the present disclosure also relates to a method of administering an injectable medicament, the method comprising the steps of preparing or reconstituting the injectable medicament using a fluid transfer device, wherein the fluid transfer device comprises:

- a body comprising a first connecting portion for connecting with a first diluent container and comprising a second connecting portion for connecting with a first medicament container,
- a first fluid channel extending into the first connecting portion to fluidically communicate with an interior of the first diluent container,
- a second fluid channel extending into the second connecting portion to fluidically communicate with an interior of the second medicament container, a discharge duct configured to connect to a discharge device, a first discharge channel, a first flow control member selectively fluidically connectable to the first fluid channel, the second fluid channel, the discharge duct and the first discharge channel, wherein the first flow control member is movably disposed in or on the body and is movable relative to the body between a first control position and a second control position, wherein when the first flow control member is in the first control position the first fluid channel is in fluid communication with the second fluid channel, and wherein when the first flow control member is in the second control position the discharge duct is in fluid communication with one of the first fluid channel and the second fluid channel and is further in fluid communication with the first discharge channel.

In the present context the terms proximal and distal are used to distinguish between opposite longitudinal direction with regard to a piercing direction along which the stopper of the injection vial can be or is to be penetrated. Here, the distal direction determines a direction along which the stopper is penetrable from outside and the proximal direction defines a direction along which the liquid substance can be withdrawn from the cavity of the injection vial.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir@); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba@); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, small modular immunopharmaceuticals (SMIP), binding-domain immunoglobulin fusion proteins, camelized antibodies, and immunoglobulin single variable domains. Additional examples of antigen-binding antibody fragments are known in the art.

The term "immunoglobulin single variable domain" (ISV), interchangeably used with "single variable domain", defines immunoglobulin molecules wherein the antigen binding site is present on, and formed by, a single immunoglobulin domain. As such, immunoglobulin single variable domains are capable of specifically binding to an epitope of the antigen without pairing with an additional immunoglobulin variable domain. The binding site of an immunoglobulin single variable domain is formed by a single heavy chain variable domain (VH domain or VHH domain) or a single light chain variable domain (VL domain). Hence, the antigen binding site of an immunoglobulin single variable domain is formed by no more than three CDRs. An immunoglobulin single variable domain (ISV) can be a heavy chain ISV, such as a VH (derived from a conventional four-chain antibody), or VHH (derived from a heavy-chain antibody), including a camelized VH or humanized VHH. For example, the immunoglobulin single variable domain may be a (single) domain antibody, a "dAb" or dAb or a Nanobody® ISV (such as a VHH, including a humanized VHH or camelized VH) or a suitable fragment thereof. [Note: Nanobody® is a registered trademark of Ablynx N.V.]; other single variable domains, or any suitable fragment of any one thereof.

"VHH domains", also known as VHHs, VHH antibody fragments, and VHH antibodies, have originally been described as the antigen binding immunoglobulin variable domain of "heavy chain antibodies" (i.e., of "antibodies devoid of light chains"; Hamers-Casterman et al. 1993 (Nature 363: 446-448). The term "VHH domain" has been chosen in order to distinguish these variable domains from the heavy chain variable domains that are present in conventional 4-chain antibodies (which are referred to herein as "VH domains") and from the light chain variable domains that are present in conventional 4-chain antibodies (which are referred to herein as "VL domains"). For a further description of VHH's, reference is made to the review article by Muyldermans 2001 (Reviews in Molecular Biotechnology 74: 277-302).

For the term "dAb's" and "domain antibody", reference is for example made to Ward et al. 1989 (Nature 341: 544), to Holt et al. 2003 (Trends Biotechnol. 21: 484); as well as to WO 2004/068820, WO 2006/030220, WO 2006/003388. It should also be noted that, although less preferred in the context of the present invention because they are not of mammalian origin, single variable domains can be derived from certain species of shark (for example, the so-called "IgNAR domains", see for example WO 2005/18629).

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

BRIEF DESCRIPTION OF THE FIGURES

Various features, effects and benefits of the fluid transfer device, the kit and a method of using the same will become apparent by the following description of examples of the fluid transfer device and the kit by making reference to the drawings, in which.

DETAILED DESCRIPTION

Figure 1:
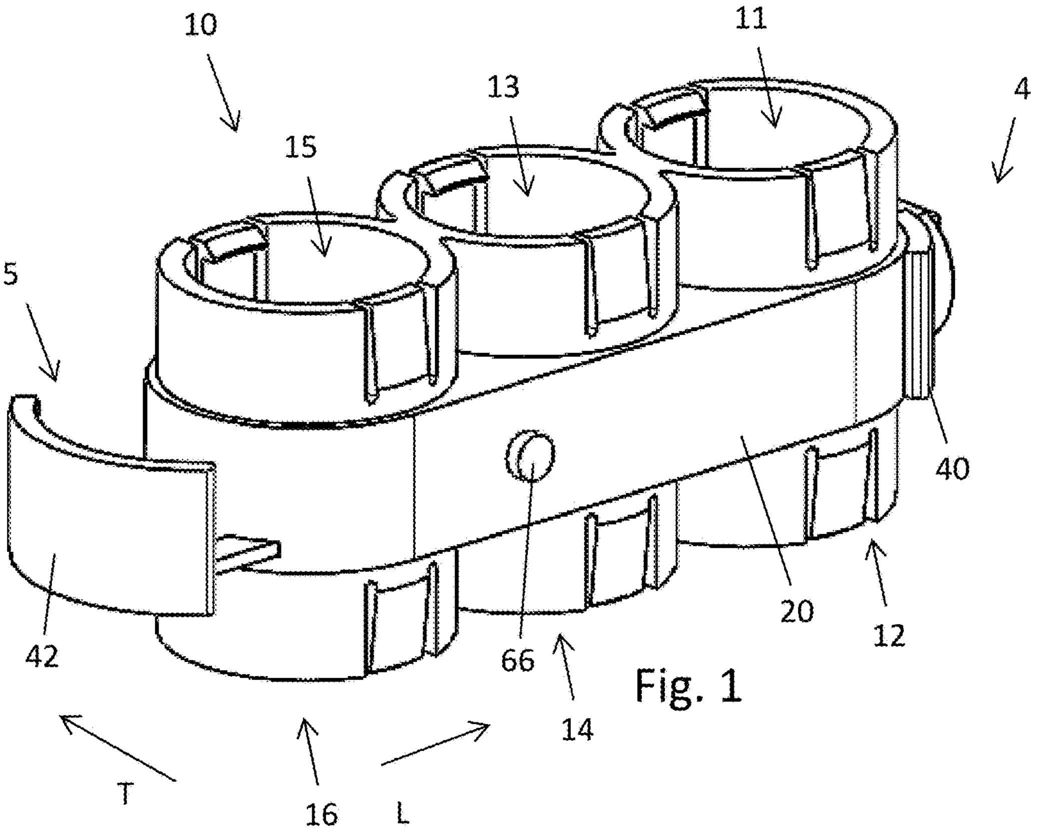
FIG. 1 schematically shows an example of a fluid transfer device.

FIGS. 1-18 show one example of a fluid transfer device 10 as well as an example of a kit 90 comprising such a fluid transfer device 10 and a number of diluent containers 71, 73, 75 and a number of medicament containers 72, 74, 76. The fluid transfer device 10 comprises a body 20. The body may comprise an injection molded plastic material. The fluid transfer device 10 comprises a first connecting portion 11, a second connecting portion 12, a third connecting portion 13, a fourth connecting portion 14, a fifth connecting portion 15 and a sixth connecting portion 16. Each connecting portion 11, 12, 13, 14, 15, 16 is provided with a receptacle 28, which is only exemplary illustrated with the first connecting portion 11 in FIG. 2.

The receptacle 28 comprises a sidewall 6, which is confined towards an insertion direction by a bottom 7. The sidewall 6 may be of tubular shape. The sidewall 6 may comprise one or numerous segments 17, that are flexible or deformable in radial direction as seen with regard to the tubular shape of the sidewall 6. The segments 17 may comprise a snap feature 18 configured to grip under a barrel head 79 of a barrel 77 of any of the containers 71, 72, 73, 74, 75, 76. The respective barrels 77 comprise a tubular shape and further comprise a radially narrowed neck portion 78 towards an outlet end that transitions further into a radially widened barrel head 79 as e.g. illustrated in FIG. 11.

The containers 71, 72, 73, 74, 75, 76 may be implemented as a so-called vial. The outlet end and hence the barrel head 79 is typically sealed by a pierceable seal 86 that can be penetrated by a spike 8, which spike 8 is provided in every of the receptacles 28 of the connecting portions 11, 12, 13, 14, 15, 16. The spike 8 comprises a tipped end and protrudes longitudinally inwardly from the bottom 7 of the receptacle 28. Near its free end the spike 8 comprises an aperture 9 that is in fluid communication with a fluid channel 21, which extends longitudinally through the spike 8 and through the bottom 7 of the respective receptacle 28 of the connecting portions 11, 12, 13, 14, 15, 16.

Figure 4:
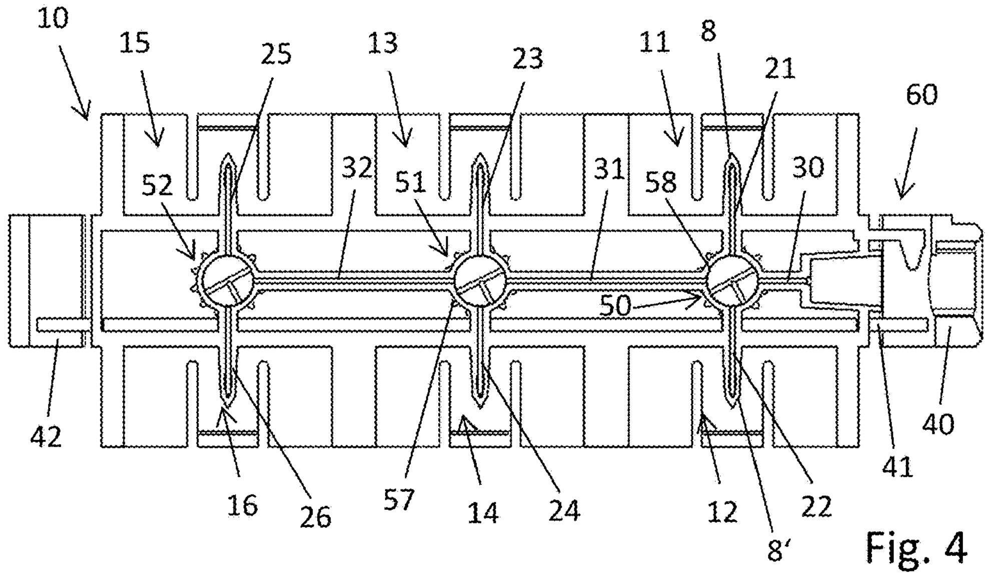
FIG. 4 shows a cross-section through the fluid transfer device in the illustration of FIG. 3.

As it is particularly illustrated in FIG. 4 the first connecting portion 11 is provided with a first spike 8. The second connecting portion is provided with a second spike 8'. The first spike 8 comprises a longitudinally extending first fluid channel 21 and the second spike 8' comprises a respective second fluid channel 22. The fluid channels 21, 22 each terminate inside the receptacle 28 with their aperture 9 at or near the pointed or tipped end of the spike 8, 8'.

Insofar, the connecting portions 11, 12, 13, 14, 15, 16 may each provide a snap fit engagement with a barrel 77 of a container 71, 72, 73, 74, 75, 76 and the respective container can be attached or inserted into the receptacle 28 in a well-defined and straightforward manner, e.g. simply by pushing a container into the receptacle 28 of a respective connecting portion 11, 12, 13, 14, 15, 16.

The containers 71, 72, 73, 74, 75, 76 are configured for longitudinal insertion into the receptacle 28, i.e., along the longitudinal extent of the spike 8. In this way the pierceable seal 86 provided at the outlet end of the respective containers 71, 72, 73, 74, 75, 76 can be pierced such that the spike aperture 9 is located inside the interior of the respective containers 71, 72, 73, 74, 75, 76 when reaching a final assembly configuration. When reaching the final assembly or fastening configuration, the snap feature 18 of the resilient segment 17 snaps or mechanically engages with the barrel head 79 to fix the respective barrel 77 to the receptacle 28 and hence to the respective connecting portion 11, 12, 13, 14, 15, 16.

The snap feature 18 of the resilient segment 17 may comprise a beveled section by way of which the snap features can be pivoted, bended or flexed radially outwardly upon insertion of the barrel head 79 into the respective receptacle 28. When reaching the final assembly configuration the radially inwardly protruding snap feature 18 snaps under the barrel head 79 and provides a form fitting engagement between the sidewall 6 and hence between the receptacle 28 and the barrel 77. The segments 17 are separated from their respective sidewall 6 by longitudinal slits 19 extending along both oppositely located circumferentially offset side edges of each segment 17. However, a lower portion of the segments 17, i.e. a portion close to the bottom 7 may be integrally formed with the sidewall 6 or with the bottom 7.

The connecting portions 11, 12, 13, 14, 15, 16 provide a detachable fastening of diluent containers 71, 73, 75 and medicament containers 72, 74, 76 to the body 20 of the fluid transfer device 10.

Figure 6:
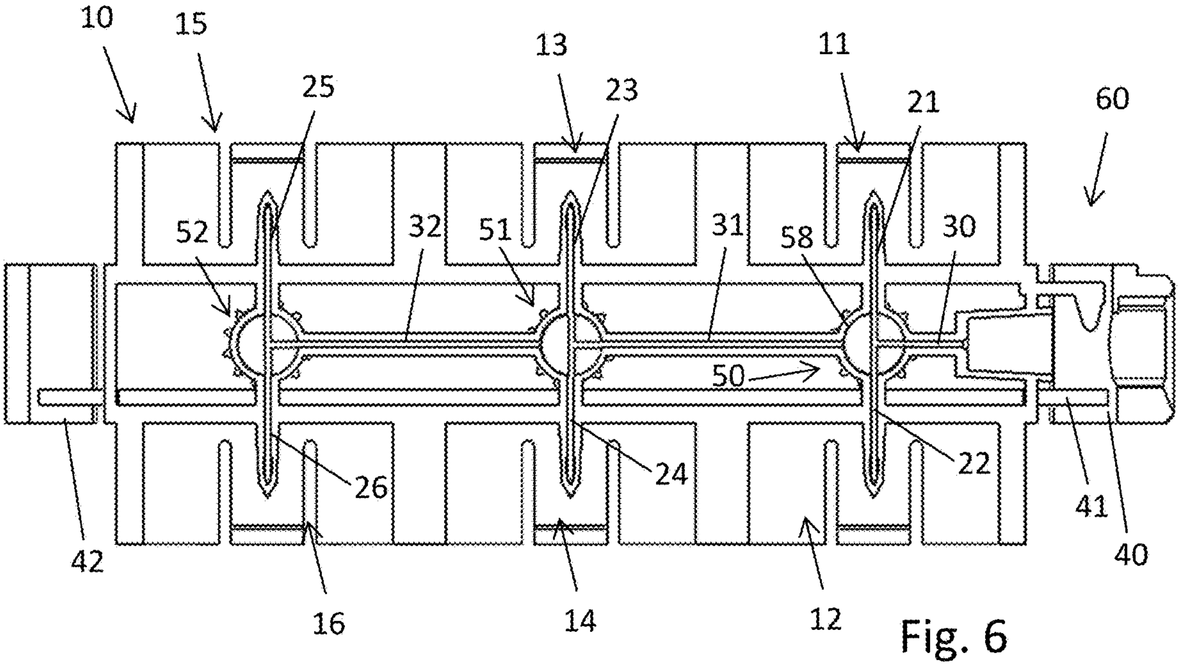
FIG. 6 shows a cross-section through the fluid transfer device with first, second and third flow control members in a first control position.

Inside the body 20 there is further provided a discharge duct 30 and a first discharge channel 31. There is further provided a first flow control member 50, which is selectively fluidically connectable to the first fluid channel 21, to the second fluid channel 22, to the discharge duct 30 and to the first discharge channel 31. In the illustration of FIG. 4 the first flow control member 50 is in a third control position. Here, the first fluid channel 21 is separated or fluidically decoupled from the second fluid channel 22. It is also fluidically decoupled from any of the discharge duct 30 and the first discharge channel 31. In a first control position of the first flow control member 50 as shown in FIG. 6 the first fluid channel 21 is fluidically coupled or fluidically connected to the second fluid channel 22. The first discharge channel 31 and the discharge duct 30 are separated or decoupled from each other. Likewise, the first fluid channel 21 is only and exclusively connected to the second fluid channel 22; and vice versa. The second fluid channel 22 is exclusively connected in a fluid transferring manner with the first fluid channel 21.

Figure 7:
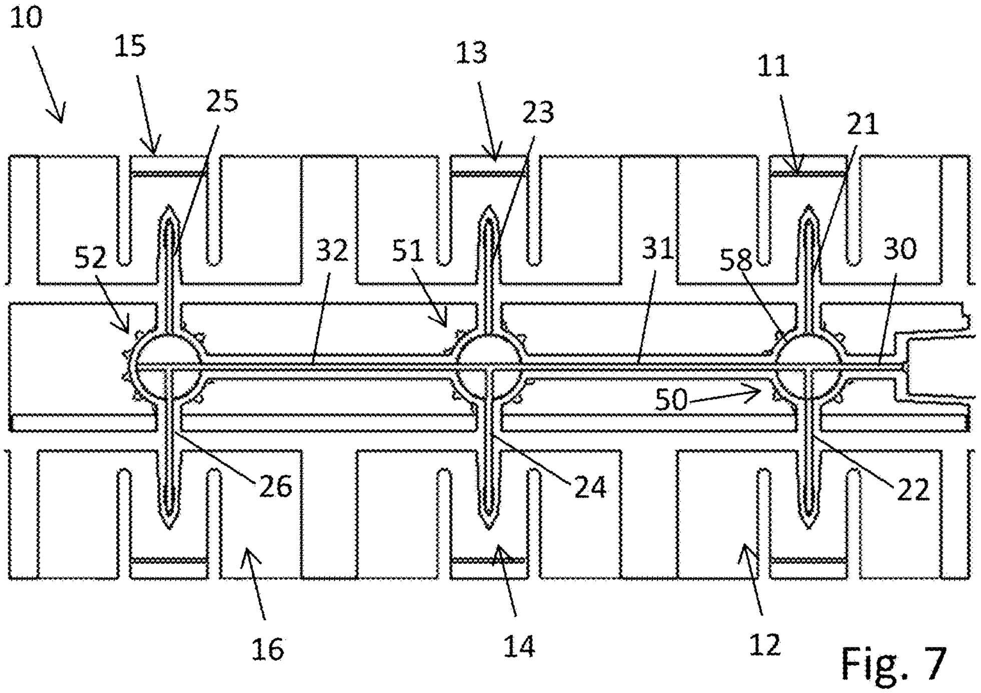
FIG. 7 shows the device according to FIG. 6 with the first, the second and the third flow control members in the second configuration.

Both, the first fluid channel 21 and the second fluid channel 22 are disconnected from both of the discharge duct 30 and the first discharge channel 31. The first flow control member 50 is transferable into a second control position as illustrated in FIG. 7. Here, the first discharge channel 31 is in flow communication with the discharge duct 30. Moreover, the discharge duct 30 is in flow communication with the second fluid channel 22. The first fluid channel 21 is disconnected from any of the further channels, the second fluid channel 22, the discharge duct 30 and the first discharge channel 31.

In the first configuration or in the first control position of the first flow control member 50 a diluent provided in a first diluent container 71 connected to the first connecting portion 11 is allowed to flow through the first fluid channel 21 through the first flow control member 50 and further through the second fluid channel 22 into the interior of a first medicament container 72 duly connected to the second connecting portion 12. In this way the medicament located in the first medicament container 72 can be mixed, dissolved, diluted, or lyophilized when getting in contact with the diluent as provided from the first diluent container 71.

Then and by switching the first flow control member 50 into the second configuration or into the second control position as shown in FIG. 7 withdrawal of the liquid medicament is allowed and provided from the first medicament container 72 via the discharge duct 30. Since the first discharge channel 31 is also in flow connection with the first discharge duct 30 there can be provided an additional flow of fluid, e.g. from a second flow control member 51 and hence further transferring components connected therewith. In addition, fluid can be transferred from the second fluid channel 22 towards the discharge duct 30.

Here, both the second fluid channel 22 and the first discharge channel 31 merge into the discharge duct 30, which can be connected to a discharge device 80 as illustrated in FIGS. 15-18. The discharge device 80 may be configured to apply a negative pressure to the discharge duct

30 to withdraw a liquid substance from both, the second fluid channel 22 and the first discharge channel 31.

Figure 5:
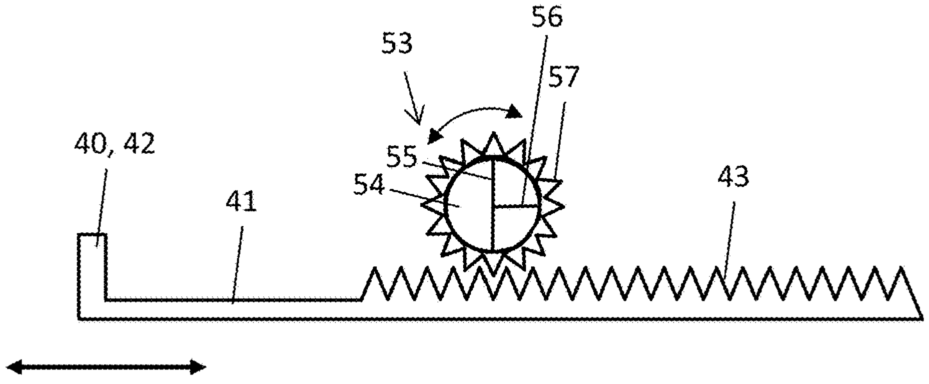
FIG. 5 shows one example of a mechanical coupling between a flow control member and the actuator.

As further illustrated in FIGS. 1-5 the fluid transfer device 10 comprises at least a first actuator 40 and an optional second actuator 42. The actuators 40, 42 are mechanically coupled to the first flow control member 50, e.g. by a rack and pinion gear as schematically illustrated in FIG. 5. The first actuator 40 may be located at a first side 4 of the body 20. The second actuator 42 may be provided at an opposite second side 5 of the body 20. In an initial configuration or in a default configuration the first flow control member 50 may be in the third control position as illustrated in FIG. 4. Here, both, the first actuator 40 and the second actuator 42 may protrude slightly from the sides 4, 5 of the body 20 so that the respective actuators 40, 42 may be pushed inwardly, hence towards the body 20 in order to induce a respective movement or reconfiguration of the first flow control member 50.

As schematically illustrated in FIGS. 4 and 5 the flow control member 50 may be implemented as a three-way valve 53. The valve 53 comprises a circular shape with a valve body 54, which is rotatably supported in a valve housing 58. The fluid channels 21, 22 as well as the discharge duct 30 and discharge channel 31 all merge at different positions into the valve housing 58. The valve body 54 comprises a passageway 55 and a branch section 56 that merges into the passageway 55. The passageway 55 is a straight through passageway extending from one side of the valve body 54 to the other side of the valve body 54.

The branch section 56 merges into the passageway for 55, e.g. into a middle portion of the passageway 55. An opposite end of the branch section 56 terminates at an outside surface of the valve body 54 that faces towards the valve housing 58.

The valve body 54 may be in mechanical engagement with the teeth 43 of a rod 41 that is connected to the actuators 40, 42. Hence, by pushing or by moving the actuator 40 and hence the rod 41 in a longitudinal direction, e.g., in longitudinal direction of the rod, there can be induced a torque onto the pinion 57 and hence onto the valve body 54. Of course, the pinion 57 of the valve body 54 is located axially outside the valve housing 58 as seen with regard to the rotation axis of the valve body 54.

In this way a pushing or sliding motion of any of the actuators 40, 42 can be translated or may transition into a respective rotation of the valve body 54 and hence of the valve 53 by way of which the flow control member 50 can be switched between two or three different configurations, namely the third configuration or position as shown in FIG. 4, the first configuration as shown in FIG. 6 and the second configuration as shown in FIG. 7. The two actuators 40, 42, which may be provided at opposite sides 4, 5 of the body 20 may be rigidly mechanically connected. Hence, a pushing of the second actuator 42 inwardly, hence towards the second side 5 and along a first direction, e.g. a longitudinal direction L, as indicated in FIG. 1, leads to a respective movement of the first actuator 40 into the same direction and hence outwardly and further away from the first side 4. An oppositely directed displacement of the first actuator 40, hence towards the first side 4 leads to a respective oppositely directed movement of both actuators 40, 42 in a second direction.

In this way, the control position of the first flow control member 50 can be universally induced by alternately applying a respective pushing force onto one of the actuators 40, 42, which is rather easy to implement and to realize by a user of the fluid transfer device 10.

The discharge duct 30 may be located at the first side 4 or at any other side of the fluid transfer device 10. The discharge duct 30 merges into a discharge device connector 34 as illustrated in FIGS. 13, 16-18. The discharge device connector 34 comprises a receptacle 35. The discharge device connector 34 is detachably connectable with a connector 84 of the discharge device 80. In the presently illustrated example the discharge device 80 comprises a syringe 81 featuring a barrel 82, which is sealed in proximal direction by a movable plunger 83. Towards a distal direction the syringe 81 comprises the connector 84 and hence a syringe tip or syringe aperture through which a liquid substance can be expelled out of the syringe barrel 82 or can be sucked into or drawn into the syringe barrel 82 by moving the plunger 83 in longitudinal direction relative to the barrel 82.

As particularly illustrated the receptacle 35 comprises a tapered sidewall 36. The shape and structure of the tapered sidewall 36 matches with the correspondingly tapered structure of the connector 84. The discharge device connector 34 and the connector 84 of the discharge device 80 may be provided with standardized fluid transferring connectors, such as male and female Luer-type connectors.

Figure 13:
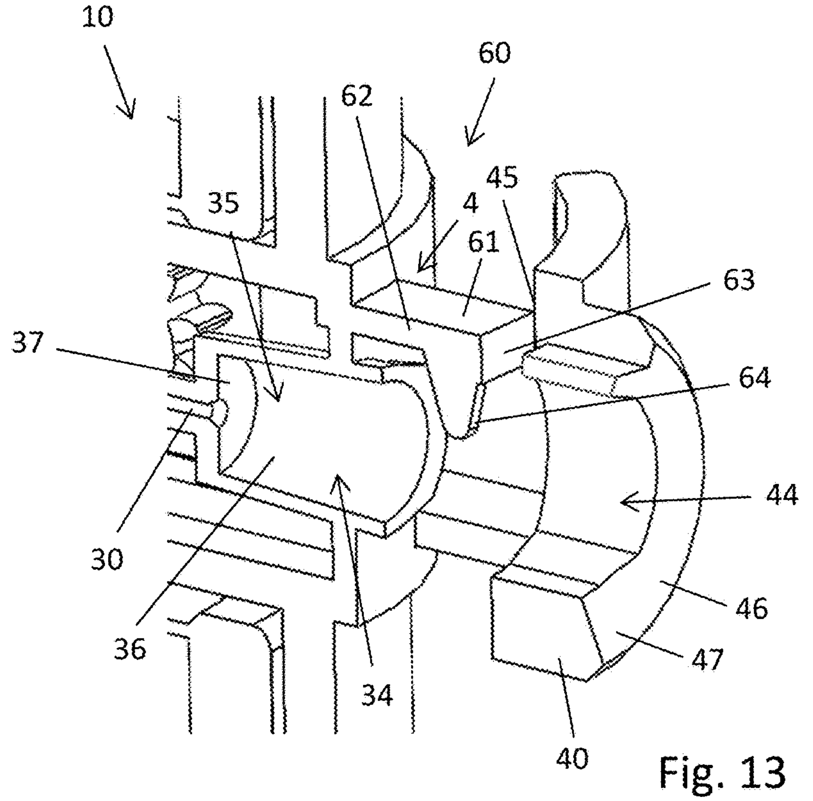
FIG. 13 is an enlarged view of the discharge device connector and the interlock mechanism as provided at the first actuator.
Figure 14:
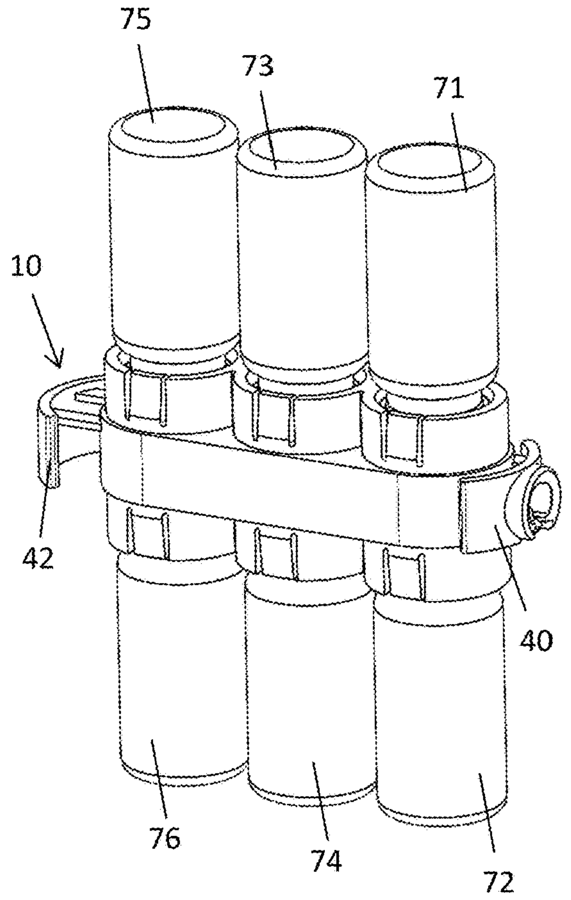
FIG. 14 shows a configuration of the fluid transfer device with the flow control members in the second configuration.
Figure 16:
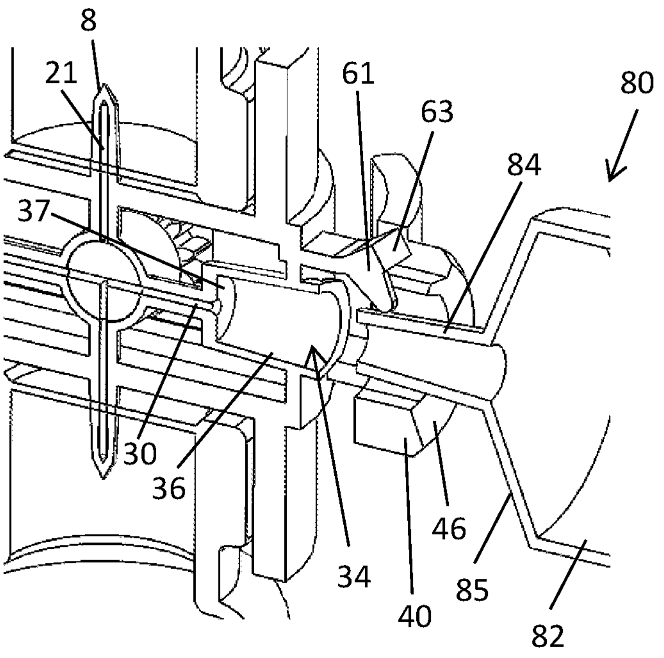
FIG. 16 is an enlarged and cross-sectional view of the configuration of FIG. 15.
Figure 17:
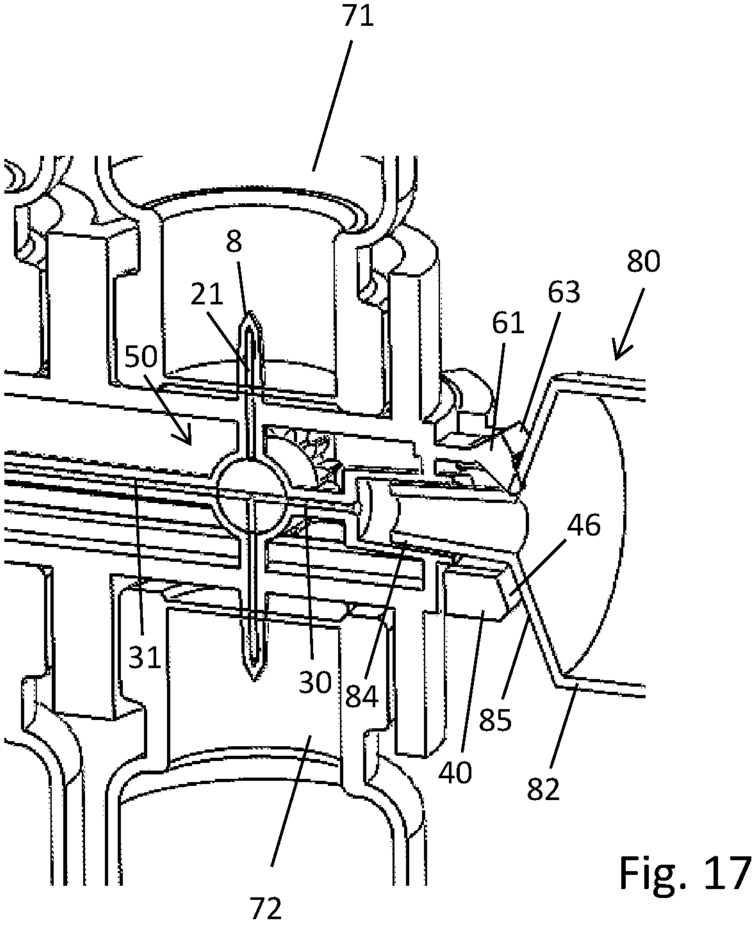
FIG. 17 is another enlarged perspective view of the configuration of FIG. 16.

As further illustrated in FIGS. 13, 16 and 17 the fluid transfer device 10 further comprises an interlock mechanism 60. The interlock mechanism 60 comprises a latch element 61, which is movable and/or which is resiliently deformable. The latch elements 61 comprises a radially inwardly extending projection 62 with a beveled section 64 facing outwardly. The projection 62 and the beveled section 64 may extend or reach inwardly, e.g. radially inwardly into the receptacle 35 of the discharge device connector 34.

Hence, and upon inserting the connector 84 of the discharge device 80 into the receptacle 35 of the discharge device connector 34, the latch elements 61 experiences an outwardly directed displacement or deformation. In an initial configuration as shown in FIG. 13 the latch element 61 features a longitudinally extending projection 62, which terminates in longitudinal or axial direction by a stop face 63. The stop face 63 is in abutment with a complementary shaped stop face 45 provided at an inside surface of the first actuator 40.

As long as the latch element 61 is in this default or initial configuration as shown in FIG. 13 the mutual engagement of the stop faces 63, 45 prevents a further inwardly directed movement of the actuator 40 towards the first side 4. It is only upon introducing the connector 84 of the discharge device 80 into the receptacle 35 of the discharge device connector 34 that the latch element 61 is pivoted in outwardly, e.g. in radial direction, thereby disengaging the stop face 63 from the stop face 45. Then and due to the disengagement of the stop faces 63, 45 the actuator 40 may be moved in longitudinal direction, hence towards the first side 4 and hence towards the discharge device connector 34 as indicated in FIG. 17.

The inwardly directed movement of the actuator 40 may transfer the first flow control member 50 into the second control position thereby establishing a fluid connection between the discharge duct 30 and the second fluid channel 22 to withdraw a liquid substance from the first medicament container 72. Insofar, the interlock mechanism 60 may effectively prevent a premature transition of the first flow control member 50 into the second control position. The second control position can be only activated or the first flow control member can be only and exclusively transitioned or transferred into the second control position when the discharge device 80 is duly connected to the discharge device connector 34. In this way patient safety and a risk of unintended loss of the medicament can be reduced.

Figure 19:
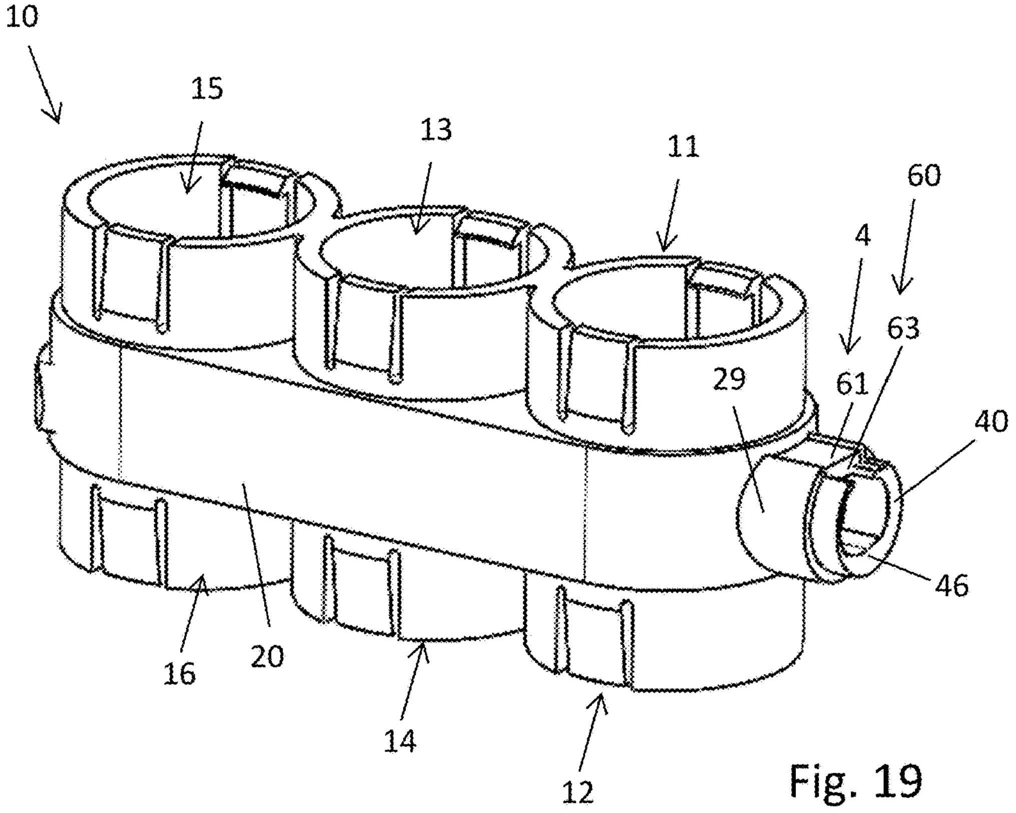
FIG. 19 shows a further example of the fluid transfer device and FIG. 20 is a flowchart of a method of preparing or reconstituting a medicament for injection by making use of the fluid transfer device as described herein.

In an alternative example as illustrated in FIG. 19 the first actuator 48 is slidingly guided in a socket 29 protruding from the first side 4 of the body 20. The socket 29 comprises a cylindrically-shaped sidewall with a through recess, in which the latch element 61 is positioned. Here and as described before in connection with FIGS. 13, 16 and 17 the latch element 61 may be also deformed or moved in radial direction upon introducing the discharge device 80 into the discharge device connector 34 to transfer the interlock mechanism 60 into a release configuration.

The example of FIG. 19 making use of the socket 29 serves to enclose or to protect the actuator 40 against jamming or pinching of any objects between an inside of the actuator 40 and/or an outside of the first side 4 of the body 20.

The fluid transfer device 10 is not only capable to provide a mixing of a fluid and a medicament as provided by a first diluent container 71 and by a first medicament container 72. Rather, the further connecting portions 13, 14, 15, 16 are likewise configured to engage or to connect with further diluent containers 73, 75 and medicament containers 74, 76. As it is immediately apparent from FIG. 4 the transfer device 10 further comprises a second flow control member 51 and a third flow control member 52. The second and third flow control members 51, 52 are implemented in the same or like manner as the first flow control member 50.

The second flow control member 51 one may be fluidically coupled or fluidically connected to the first flow control member 50 through the first discharge channel 31. The third flow control member 52 may be connected to the second flow control member 51 via a second discharge channel 32. The discharge channels 32, 31 one and the discharge duct 30 may be fluidically connected in series via the first flow control member 50 and the second flow control member 51. Hence, the second flow control member 51 may be located between the first discharge channel 31 and the second discharge channel 32.

When the second flow control member 51 is in the second control position it provides a fluid communication between the first discharge channel 31 and the second discharge channel 32. The third connecting portion 13 is provided with a third fluid channel 23. The fourth connecting portion 14 is provided with a fourth fluid channel 24. The fifth connecting portion 15 provided with a fifth fluid channel 25 and the sixth connecting portion 16 is provided with a sixth fluid channel 26. The fifth fluid channel 25 and the sixth fluid channel 26 terminates with a free end in a spike 8 and in a spike aperture as described in connection with the first connecting portion 11. Likewise, the third fluid channel 23 and the fourth fluid channel 24 also terminate with their free end in a spike 8, that is located in a respective receptacle 28 of the third connecting portion 13 and the fourth connecting portion 14.

Opposite ends of the fluid channels 25, 26 merge in the third flow control member 52. The inside ends of the fluid channels 23, 24 merge with the second flow control member 51. Accordingly and as described above, when the second flow control member 51 is in the first control position it provides a fluid communication between the fluid channels 23, 24. When the third flow control member 52 is in the first control position it provides a fluid communication between the fluid channels 25 and 26.

As further illustrated in FIG. 7 and when the flow control member 50, 51, 52 are in the second control position the third flow control member 52 provides a fluid connection between the sixth fluid channel 26 with the second discharge channel 32. The second flow control member 51 provides a fluid communication between the first discharge channel 31 and the second discharge channel 32. Furthermore, it provides a fluid connection between the discharge channel 31, 32 and the fourth fluid channel 24.

Typically, the flow control members 50, 51, 52 are mechanically coupled to each other and/or mechanically coupled to at least one of the first actuator 40 and the second actuator 42 in the same way as described above in connection with FIG. 5. There may be provided also alternative mechanical couplings between the actuators 40, 42 and the flow control members 50, 51, 52.

In the presently illustrated example the body 20 is of elongated structure. It may extend along a longitudinal direction L. The numerous connecting portions 11, 12, 13, 14, 15, 16 each comprise a receptacle 28 of tubular shape, with a bottom 7 being formed in a transverse plane as defined by the longitudinal direction L and a transverse direction T. In the present context and when describing the geometry of the tubular-shaped sidewall 6 of the numerous receptacles 28 the longitudinal or axial direction may point perpendicular to the plane as defined by the longitudinal direction L and a transverse direction T.

Furthermore, and as it is immediately apparent from FIG. 4, the first and the second connecting portions 11, 12 are provided at an upper side and an underside of the fluid transfer device 10. They are provided on opposite upper and lower sides of the body 20. The receptacles 28 of the first connecting portion 11 and second connecting portion 12 are open in opposite directions perpendicular to the plane as defined by the longitudinal direction L and a transverse direction T as illustrated in FIG. 1. Accordingly, also the spikes 8, 8' as provided in the receptacle 28 of oppositely located first and second connecting portions 11, 12 point in opposite directions.

Insofar, the first connecting portion 11 and the second connecting portion 12 are provided on opposite sides of the first flow control member 50. Likewise, the third connecting portion 13 and the fourth connecting portion 14 are provided on opposite sides of the second flow control member 51. The fourth connecting portion 14 and the fifth connecting portion 15 are provided on opposite sides of the third flow control member 52.

The first flow control member 50, the second flow control member 51 and the second flow control member 52 are longitudinally offset along the longitudinal direction L. They are arranged next to each other as seen in the longitudinal direction L. They may form an array extending along the longitudinal direction L. Moreover, the discharge channels 31, 32 extend longitudinally between the first and second flow control members 50, 51 as well as between the second and third flow control members 51, 52.

Figure 2:
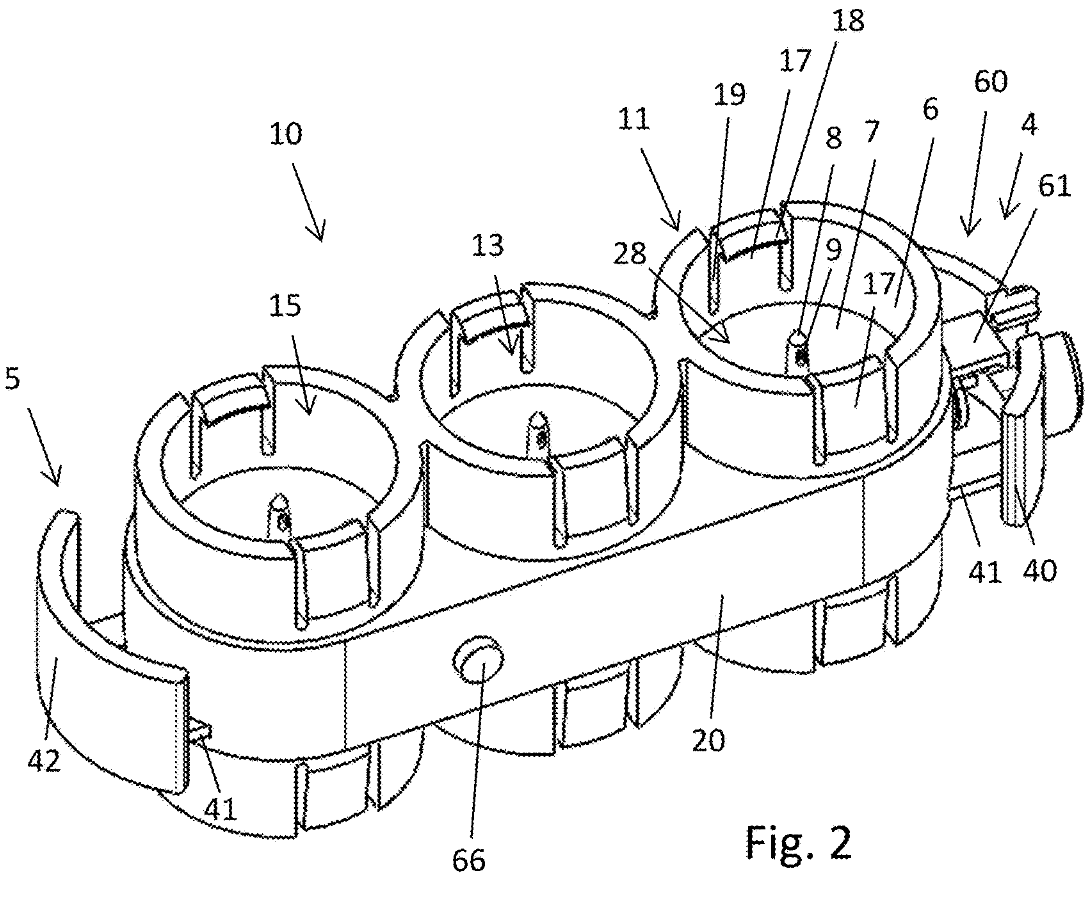
FIG. 2 shows another perspective of the fluid transfer device.
Figure 3:
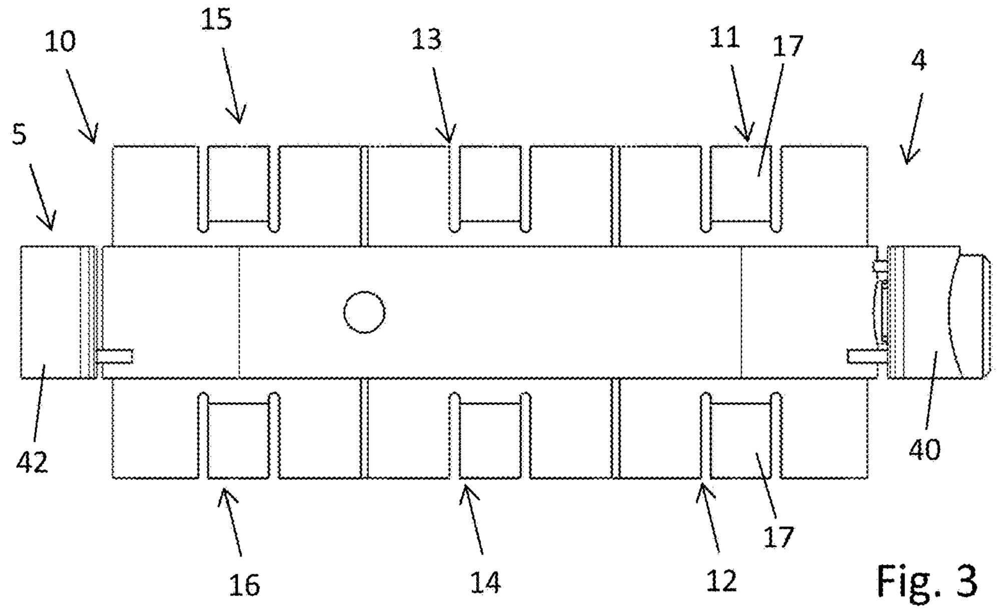
FIG. 3 shows a side view of the fluid transfer device.

In FIGS. 1 and 2 there is further shown a release member 66, which may be mechanically coupled to at least one of the actuators 40, 42 or the rod 41. The release member 66 may protrude outwardly from the body 20 and may have to be depressed manually by a user of the fluid transfer device 10 in order to enable a movement of any of the actuators 40, 42 when the fluid transfer device is in a default configuration, e.g., in which the flow control members 50, 51, 52 are in the third control position.

Figure 8:
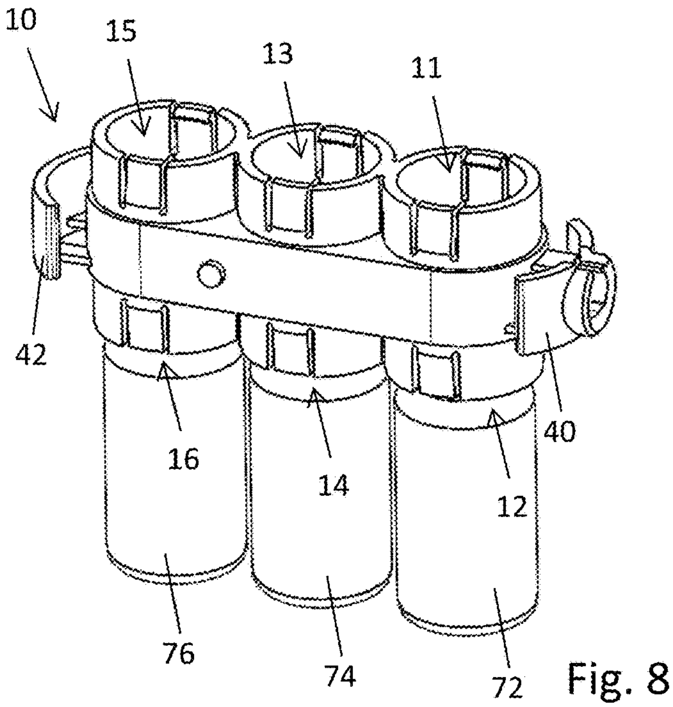
FIG. 8 shows an example of the fluid transfer device, wherein first, second and third medicament containers are attached to the fluid transfer device.

In the following, one way of using the fluid transfer device 10 is described in more detail by making reference to the sequence of FIGS. 8-18. In FIG. 8 the fluid transfer device 10 is provided in a default configuration, e.g. in a configuration, wherein the flow control members 50, 51, 52 are in the third control position as indicated in FIG. 4. It may be then that individual medicament containers 72, 74, 76 are connected to respective second, fourth and sixth connecting portions 12, 14, 16. By connecting the medicament container 72, 74, 76 to the respective connecting portion 12, 14, 16 the respective spike 8' pierces the pierceable seal 86 of each container as shown in FIG. 11.

Figure 9:
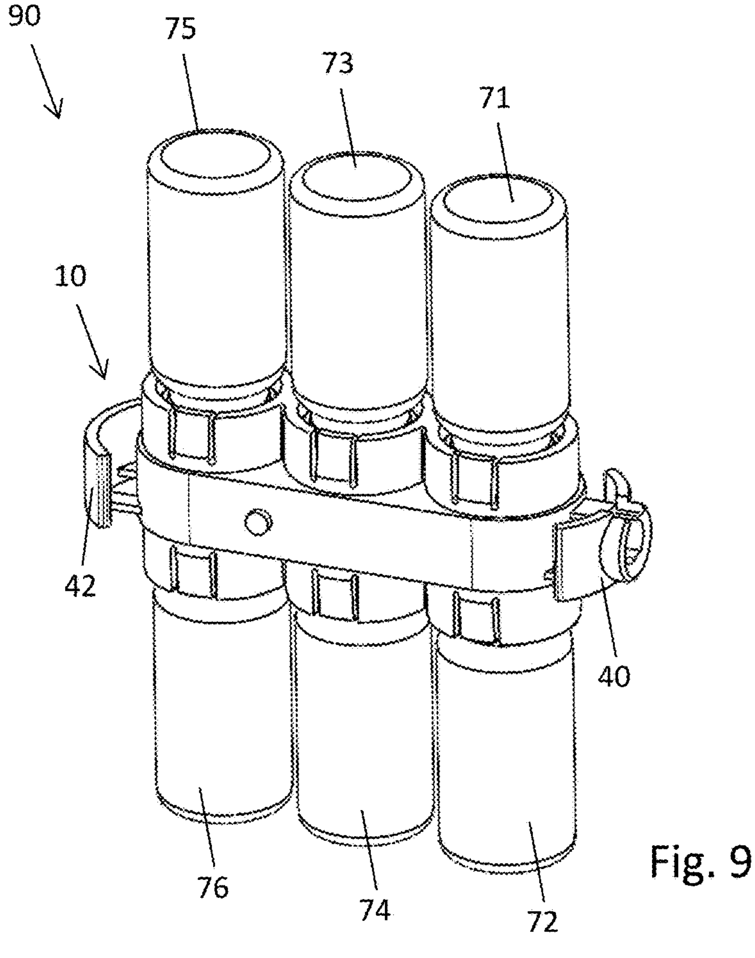
FIG. 9 shows the device according to FIG. 8 with first, second and third diluent containers are attached to the fluid transfer device.
Figure 10:
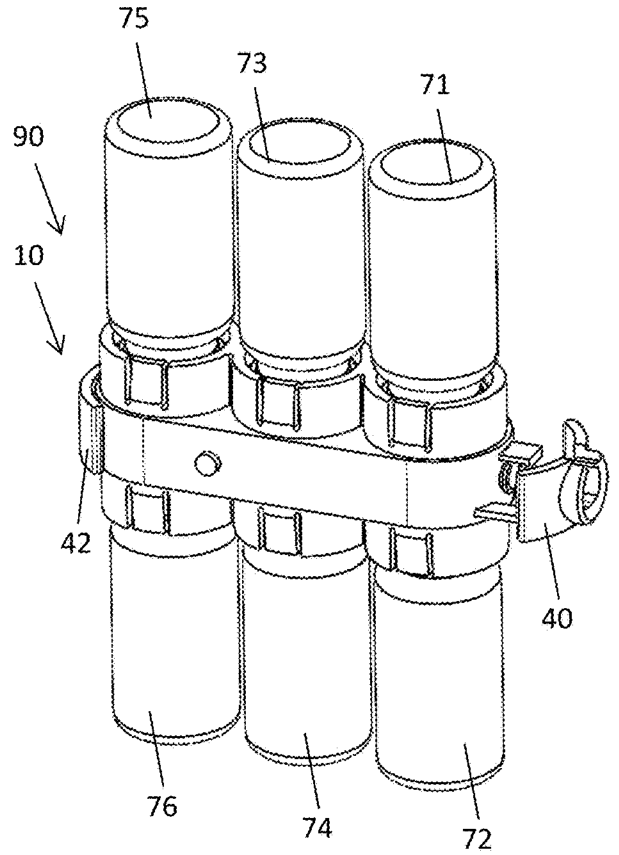
FIG. 10 shows the fluid transfer device with the flow control members in their first control position.

Thereafter, or simultaneously with fixing or connecting the medicament containers 72, 74, 76 with the fluid transfer device 10 there may be also connected diluent containers 71, 73, 75 with respective first, second and third connecting portions 11, 13, 15 of the fluid transfer device 10 as indicated in FIG. 9. The illustration of FIG. 9 shows the kit 90 comprising the fluid transfer device 10, at least one diluent container 71, 73, 75 and at least one medicament container 72, 74, 76. It may be then that a user depresses the second actuator 42 in a first direction, e.g. in longitudinal direction L, so as to reduce the distance between the actuator 42 and the second side of 5 of the body 20 of the fluid transfer device 10. By pushing or depressing the second actuator 42 the flow control members 50, 51, 52 are transferred into the first configuration or into their respective first control position as indicated in FIG. 6.

Accordingly, the first fluid channel 21 fluidically communicates with the second fluid channel 22. The third fluid channel 23 communicates with the fourth fluid channel 24 and the fifth fluid channel 25 gets in a fluid transferring configuration with the sixth fluid channel 26. Accordingly, the diluent provided in the first diluent container 71 is allowed to flow or transfer into the first medicament container 72. The diluent provided in the second diluent container 73 is allowed to flow into the second medicament container 74. The diluent provided in the third diluent container 75 is allowed to flow into the third medicament container 76. In some examples the medicament containers 72, 74, 76 may be vacuumized or may be provided with a negative pressure by way of which ingress of the diluent into the respective medicament container 72, 74, 76 may be improved upon establishing a fluid transferring connection with a respective diluent container 71, 73, 75.

Figure 11:
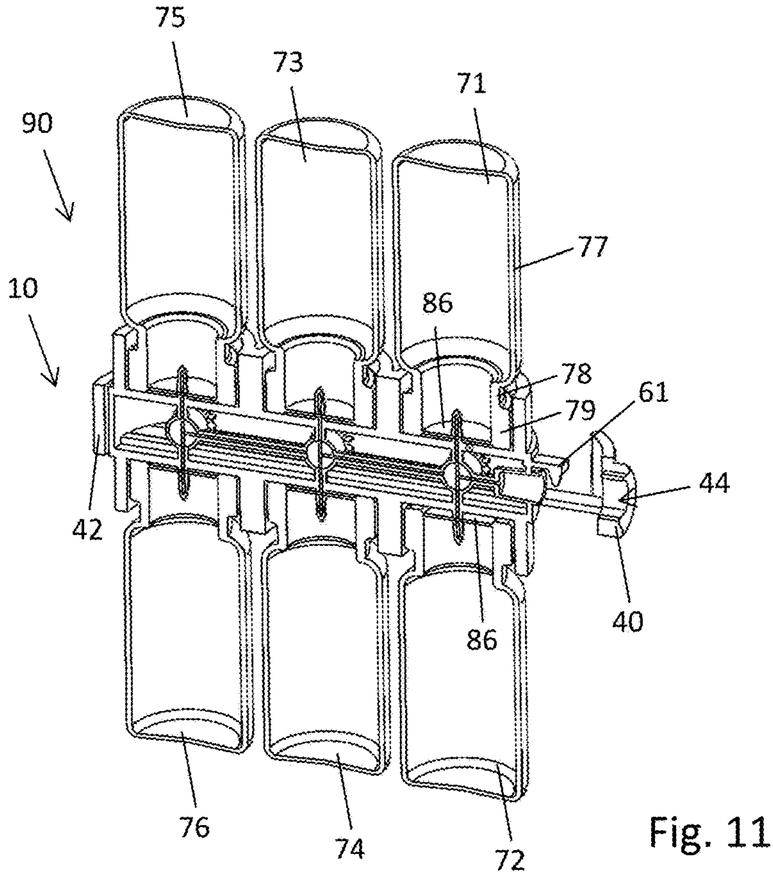
FIG. 11 shows a cross-section through the configuration of FIG. 10.

The fluid communication between the various containers is particularly illustrated in FIG. 11. Now, a mixing, dissolving, diluting and/or reconstitution process may take place in the medicament container 72, 74, 76. The mixing or reconstitution process may be accompanied by a well-defined mechanical treatment, e.g. by a rotating, pivoting or gentle shaking of the respective medicament containers 72, 74, 76 while the respective containers remain connected and fixed or fastened to the fluid transfer device 10.

Figure 12:
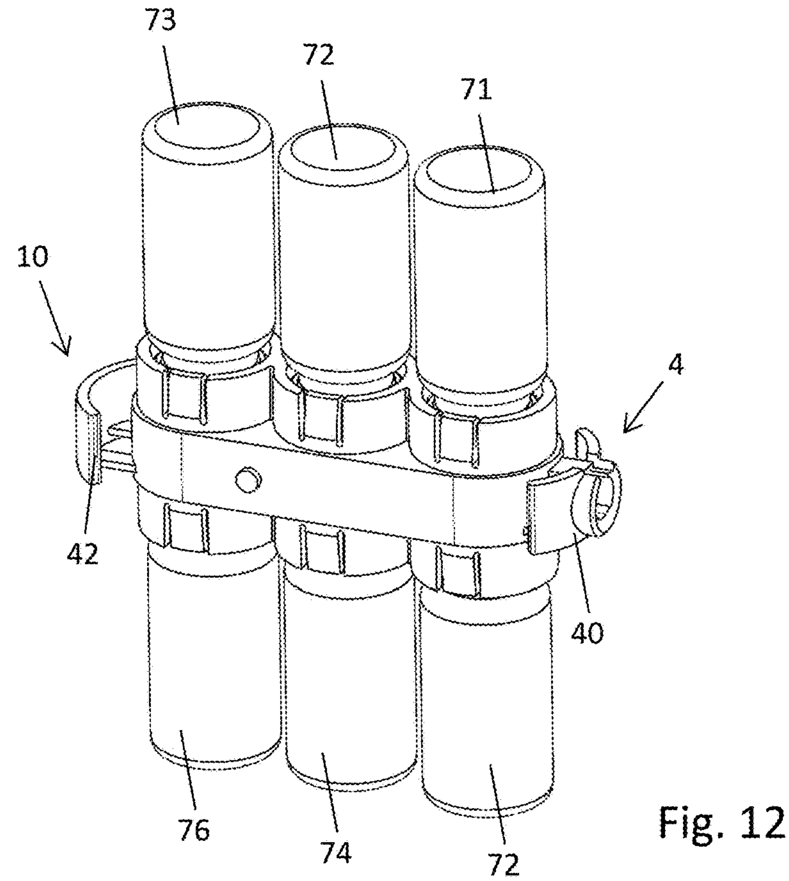
FIG. 12 shows a configuration of the fluid transfer device with the flow control members in their third control position.

Then, a user may apply pressure to the first actuator 40, by way of which both actuators 40, 42, which may be rigidly connected are moved in a second longitudinal direction, by way of which the first actuator 40 approaches the first side 4 of the body 20 as illustrated in FIG. 12. This motion may be delimited by the interlock mechanism 60 as described above in connection with FIGS. 13, 16 and 17. The interlock mechanism 60 may be configured to allow a movement of the first and/or second actuators 40, 42 from the first actuation position into the third actuation position, e.g., the default position of the first and second actuators 40, 42. In this configuration the flow control members 50, 51, 52 may be in their respective third control position, in which the various fluid channels 21, 22, 23, 24, 25, 26 are fluidically decoupled or disconnected.

The interlock mechanism 60 may prevent a further displacement of the first or second actuators 40, 42 towards the second actuating position, by way of which the fluid control members 50, 51, 52 would be transferred into the second control position.

Figure 15:
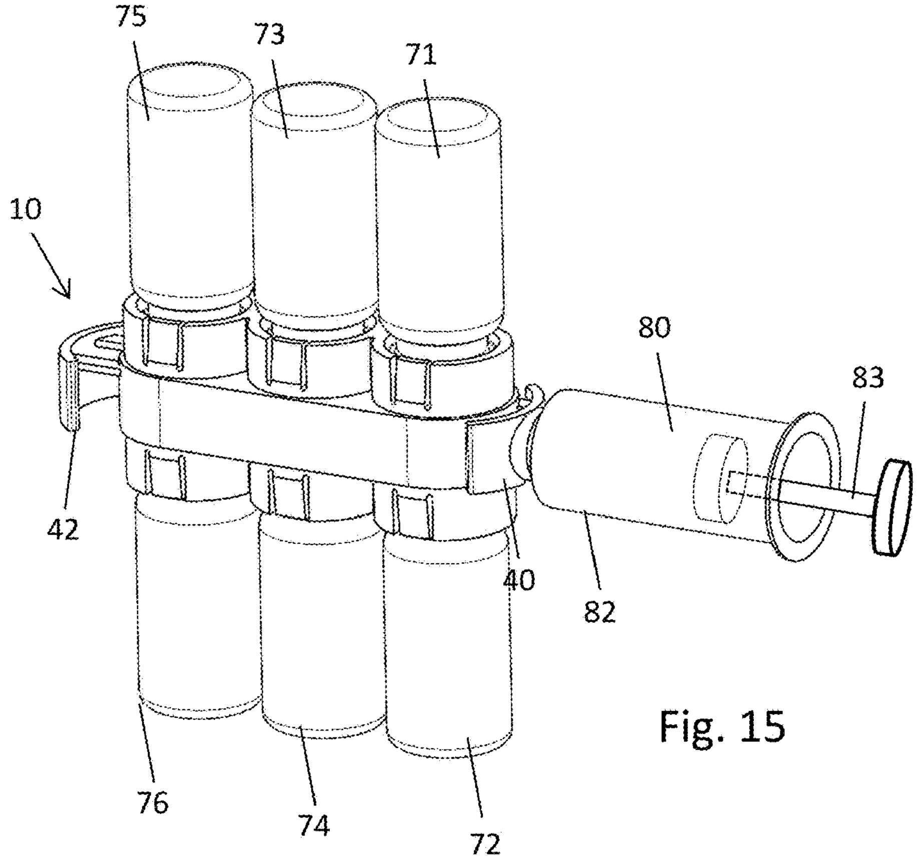
FIG. 15 shows a connection of the discharge device to the discharge duct.

Thereafter and as illustrated in FIGS. 15 and 16 the discharge device 80 may have to be connected to the discharge device connector 34 by way of which the interlock mechanism 60 may be transferred from a locking configuration into the release configuration as indicated in FIGS. 16 and 17. Then, the discharge device 80 may be further pushed towards the first side 4, by way of which the first actuator 40 may be displaced towards the first side 4 of the body 20, for this, a shoulder portion 85 of the discharge device 80 may get in longitudinal abutment with a complementary shaped abutment face 46 and an outside surface of the first actuator 40. The first actuator 40 may comprise a collar 47, which provides the abutment face 46 on an outside surface. The collar 47 may encircle or enclose a through recess 44, which is longitudinally aligned with the receptacle 35 of the discharge device connector 34. The through recess 44 may be sized to receive the discharge device connector 84 longitudinally there through.

Figure 18:
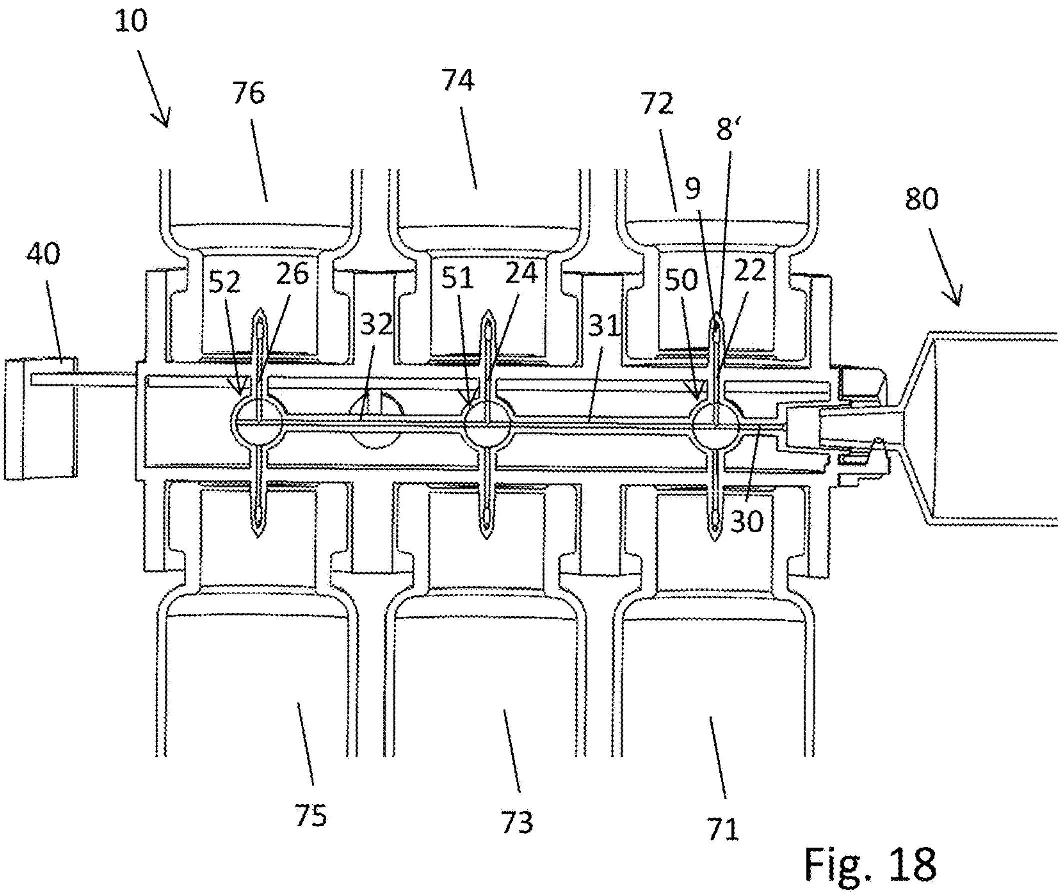
FIG. 18 is a cross-sectional view during withdrawal of the reconstituted medicament via the discharge duct.

This movement of the first actuator 40 induces a transfer of the flow control members 50, 51, 52 into the second control position as indicated in FIG. 7. It may be then of particular benefit to reorient the fluid transfer device 10 as indicated in FIG. 18. Hence, it may be of benefit to orient the medicament containers 72, 74, 76 upside down so that the liquid fraction or the liquid medicament contained in the medicament containers 72, 74, 76 gets in directly contact with the aperture 9 of the respective spikes 8'. Then, a user may apply negative pressure to the discharge channel 31, e.g. by withdrawing the plunger 83 of the discharge device 80 in a proximal direction, hence away from the outlet or inlet end of the discharge device 80.

Now and since the sixth fluid channel 26 is in fluid connection with the second discharge channel 32 via the third flow control member 50 and since the second discharge channel 32 is fluidically connected to the first discharge channel 31 via the second flow control member 51 as well as since the fourth fluid channel 24 is in flow connection with the first discharge channel 31 through the second flow control member 51 and further since the second fluid channel 22 is in fluid communication with the discharge duct all three medicament containers 72, 74, 76 are fluidically connected in parallel relative to each other and merge into the fluid line formed or constituted by the second discharge channel 32, the first discharge channel 31 and the discharge duct 30.

The medicament containers 72, 74, 76 are connected in series via the fluid connection across the first flow control member 50 and the second flow control member 51, namely in that the second discharge channel 32 is fluidically connected to the first discharge channel 31 and that the first discharge channel 31 is further fluidically connected to the discharge duct 30.

In this way, the liquid substance of the reconstituted medicament located inside the individual medicament containers 72, 74, 76, e.g., in respective medicament vials can be simultaneously withdrawn into a common discharge device 80. In this way, there can be provided an effective pooling of a rather large number of doses of one medicament or of different medicaments.

Figure 20:
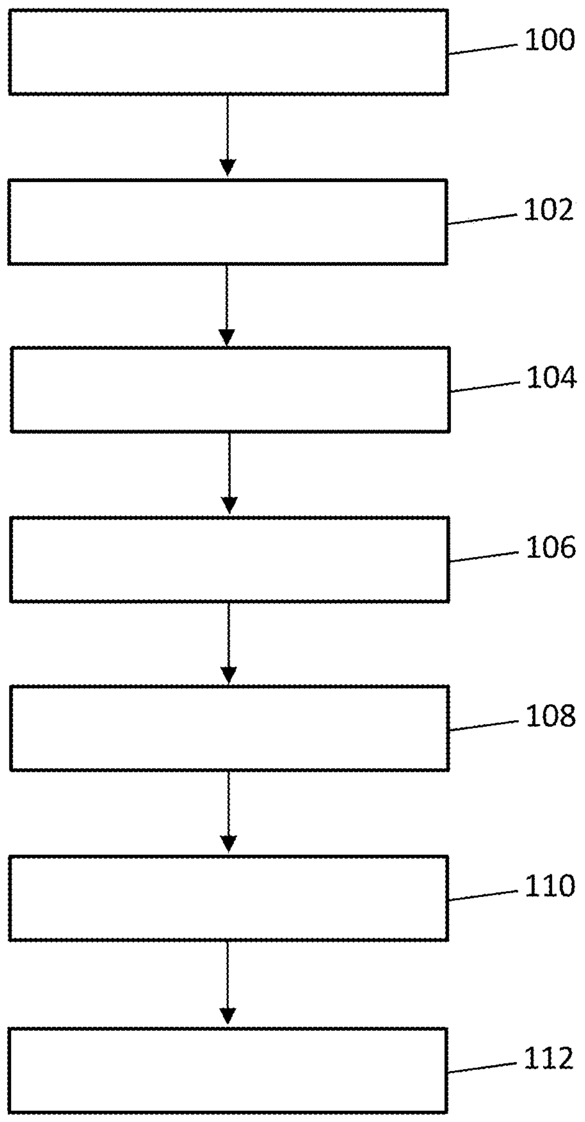

The flowchart according to FIG. 20 illustrates numerous steps of an exemplary use of the fluid transfer device 10. In a first step 100 the fluid transfer device is used and/or provided. In step 102 at least a first diluent container 71 is connected to the first connecting portion 11 of the body 20 of the fluid transfer device 10. In 104 a first medicament container 72 is connected to the second connecting portion 12 of the fluid transfer device 10. Optionally, there are also connected further diluent container 73, 75 to respective third and fifth connecting portions 13, 15 of the fluid transfer device 10. In addition, there may be also connected second and third medicament containers 74, 76 to respective fourth and sixth connecting portions 14, 16.

In step 106 the first flow control member 50 and optionally also further flow control members 51, 52 are transferred into the first control position. In step 108 a diluent provided in a diluent container is transferred into an oppositely located or into an associated medicament container. Hence, a diluent provided in the first diluent container 71 is transferred into the first medicament container 72. It is exclusively transferred only into the first medicament container 72.

Likewise, also further diluent provided in second and third diluent container 73, 75 is transferred into a respective second and third medicament containers 74, 76. By transferring the diluent into the medicament containers 72, 74, 76 there can be conducted a medicament preparation, e.g., a medicament reconstitution. In a subsequent step 110 the flow control member 50 and optionally also further flow control members 51, 52 are transferred into the second control position. In this way the medicament containers 72, 74, 76 become fluidically connected to the discharge duct 30. In step 112 the reconstituted or otherwise prepared medicament located in the various medicament containers 72, 74, 76 can be withdrawn via the discharge duct 30 into a discharge device 80 by applying a negative pressure to the discharge duct 30.

The invention claimed is:

1. A fluid transfer device comprising:

a body comprising a first connecting portion for connecting with a first diluent container, and a second connecting portion for connecting with a first medicament container;

a first fluid channel extending into the first connecting portion to fluidically communicate with an interior of the first diluent container;

a second fluid channel extending into the second connecting portion to fluidically communicate with an interior of the first medicament container;

a discharge duct configured to connect to a discharge device;

a first discharge channel;

a first flow control member selectively fluidically connectable to the first fluid channel, the second fluid channel, the discharge duct, and the first discharge channel;

wherein the first flow control member is movably disposed in or on the body and is movable relative to the body between a first control position and a second control position;

wherein when the first flow control member is in the first control position, the first fluid channel is in fluid communication with the second fluid channel; and wherein when the first flow control member is in the second control position, the discharge duct is in fluid communication with the first fluid channel or the second fluid channel, and is further in fluid communication with the first discharge channel.

2. The fluid transfer device according to claim 1, wherein the first flow control member is movable relative to the body into a third control position, in which the first fluid channel is disconnected from the second fluid channel; and wherein the discharge duct is disconnected from at least one of the first fluid channel, the second fluid channel, or the first discharge channel.

3. The fluid transfer device according to claim 1, comprising a first actuator mechanically coupled to the first flow control member and movable relative to the body by a user to induce a movement of the first flow control member into the second control position.

4. The fluid transfer device according to claim 3, comprising a second actuator mechanically coupled to the first flow control member and movable relative to the body by a user to induce a movement of the first flow control member into the first control position.

5. The fluid transfer device according to claim 4, wherein the first actuator is located at a first side section of the body; and wherein the second actuator is located at a second side section of the body opposite the first side section.

6. The fluid transfer device according to claim 3, comprising an interlock mechanism mechanically engageable with the first actuator and switchable between a locking configuration and a release configuration;

wherein when in the locking configuration, the interlock mechanism is operable to block a movement of the first actuator into the second control position.

7. The fluid transfer device according to claim 6, comprising a discharge device connector in fluid communication with the discharge duct and configured to mechanically connect with the discharge device.

8. The fluid transfer device according to claim 7, wherein the discharge device connector is operably connected to the interlock mechanism and wherein the interlock mechanism is transferable into the release configuration by establishing a mechanical connection between the discharge device connector and the discharge device.

9. The fluid transfer device according to claim 1, comprising:

a third connecting portion for connecting with a second diluent container;

a fourth connecting portion for connecting with a second medicament container;

a third fluid channel extending into the third connecting portion to fluidically communicate with an interior of the second diluent container;

a fourth fluid channel extending into the fourth connecting portion to fluidically communicate with an interior of the second medicament container;

a second flow control member selectively fluidically connectable to the third fluid channel, the fourth fluid channel, and the first discharge channel;

wherein the second flow control member is movably disposed in or on the body and is movable relative to the body between a first control position and a second control position;

wherein when the second flow control member is in the first control position, the third fluid channel is in fluid communication with the fourth fluid channel; and wherein when the second flow control member is in the second control position, the first discharge channel is in fluid communication with the third fluid channel or the fourth fluid channel.

10. The fluid transfer device according to claim 9, further comprising:

a fifth connecting portion for connecting with a third diluent container;

a sixth connecting portion for connecting with a third medicament container;

a fifth fluid channel extending into the fifth connecting portion to fluidically communicate with an interior of the third diluent container;

a sixth fluid channel extending into the sixth connecting portion to fluidically communicate with an interior of the third medicament container;

a second discharge channel in flow communication with the second flow control member;

a third flow control member selectively fluidically connectable to the fifth fluid channel, the sixth fluid channel, and the second discharge channel;

wherein the third flow control member is movably disposed in or on the body and is movable relative to the body between a first control position and a second control position;

wherein when the third flow control member is in the first control position, the fifth fluid channel is in fluid communication with the sixth fluid channel; and wherein when the third flow control member is in the second control position, the second discharge channel is in fluid communication with the fifth fluid channel or the sixth fluid channel.

11. The fluid transfer device according to claim 10, wherein when the second flow control member is in the second control position, the second discharge channel is in fluid communication with the first discharge channel.

12. The fluid transfer device according to claim 9, wherein the first flow control member and the second flow control member are synchronized.

13. The fluid transfer device according to claim 9, wherein the first flow control member comprises a three-way valve.

14. A kit comprising:

at least a first diluent container;

at least a first medicament container; and a fluid transfer device comprising:

a body comprising a first connecting portion for connecting with the first diluent container, and a second connecting portion for connecting with the first medicament container;

a first fluid channel extending into the first connecting portion to fluidically communicate with an interior of the first diluent container;

a second fluid channel extending into the second connecting portion to fluidically communicate with an interior of the first medicament container;

a discharge duct configured to connect to a discharge device, a first discharge channel;

a first flow control member selectively fluidically connectable to the first fluid channel, the second fluid channel, the discharge duct, and the first discharge channel;

wherein the first flow control member is movably disposed in or on the body and is movable relative to the body between a first control position and a second control position;

wherein when the first flow control member is in the first control position the first fluid channel is in fluid communication with the second fluid channel, and wherein when the first flow control member is in the second control position, the discharge duct is in fluid communication with the first fluid channel or the second fluid channel, and is further in fluid communication with the first discharge channel.

15. A method of preparing a medicament for injection or infusion, the method comprising:

using a fluid transfer device comprising a first connecting portion, a second connecting portion, a discharge duct, and a first flow control member transferable into first and second control positions, respectively;

connecting a first diluent container to the first connecting portion of the fluid transfer device;

connecting a first medicament container to the second connecting portion of the fluid transfer device;

transferring the first flow control member into the first control position;

transferring a diluent from the first diluent container into the first medicament container to prepare the medicament;

transferring the first flow control member into the second control position; and withdrawing at least a portion of the prepared medicament from the first medicament container via the discharge duct.

* * * * *